US011393301B1

(12) United States Patent
Wilson et al.

(10) Patent No.: US 11,393,301 B1
(45) Date of Patent: Jul. 19, 2022

(54) HYBRID RETAIL ENVIRONMENTS

(71) Applicant: Amazon Technologies, Inc., Seattle, WA (US)

(72) Inventors: Shane Michael Wilson, Mercer Island, WA (US); Matthew Norman, Issaquah, WA (US); Jayakrishnan Kumar Eledath, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 219 days.

(21) Appl. No.: 16/363,255

(22) Filed: Mar. 25, 2019

(51) Int. Cl.
G07G 1/00 (2006.01)
G07G 1/14 (2006.01)
G06Q 20/20 (2012.01)
G07C 9/00 (2020.01)
G07C 9/20 (2020.01)

(52) U.S. Cl.
CPC ......... *G07G 1/0036* (2013.01); *G06Q 20/202* (2013.01); *G06Q 20/206* (2013.01); *G07C 9/00571* (2013.01); *G07C 9/20* (2020.01); *G07G 1/14* (2013.01)

(58) Field of Classification Search
CPC ........ G06Q 30/06; G06Q 99/00; G06Q 20/20; G06Q 20/40; G06Q 30/02; G06K 15/00
USPC ....... 705/26.1, 7.29, 14.27, 16; 235/380–385
See application file for complete search history.

(56) References Cited

U.S. PATENT DOCUMENTS

| | | | |
|---|---|---|---|
| 5,013,896 A * | 5/1991 | Ono | A47F 9/048 235/375 |
| 5,992,570 A * | 11/1999 | Walter | A47F 9/048 186/36 |
| 6,769,610 B2 * | 8/2004 | Habara | G06Q 20/24 235/380 |
| 7,076,441 B2 * | 7/2006 | Hind | G06Q 10/087 705/7.29 |
| 7,143,938 B2 * | 12/2006 | Hammerle | A47F 9/04 235/383 |
| 8,106,775 B2 * | 1/2012 | Ohkawa | G07G 3/006 340/572.1 |
| 9,082,114 B2 * | 7/2015 | Colley | G06Q 20/18 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 9,741,241 B2 * | 8/2017 | Mizui | H04N 1/00323 |
| 10,127,438 B1 | 11/2018 | Fisher et al. | |
| 10,133,933 B1 | 11/2018 | Fisher et al. | |
| 2013/0284806 A1 | 10/2013 | Margalit | |
| 2014/0172610 A1 * | 6/2014 | Carpenter | G06Q 20/40 705/26.1 |

(Continued)

*Primary Examiner* — Olusegun Goyea
(74) *Attorney, Agent, or Firm* — Lee & Hayes, P.C.

(57) ABSTRACT

This disclosure describes, in part, systems for enabling physical retail stores and other facilities to implement both automated- and manual-checkout techniques for customers of the stores and/or facilities. For example, the described systems may enable a retail store to implement technology where users are able to pick items from shelves and other inventory locations and exit the store without performing manual checkout of the items, as well as technology to allow users to pay for their items using point-of-sale (POS) and/or other manual-checkout techniques. The systems described herein thus enable hybrid retail facilities, as opposed to a retail facility that is either entirely traditional or entirely enabled for automated checkout.

16 Claims, 12 Drawing Sheets

(56) References Cited

U.S. PATENT DOCUMENTS

| | | | |
|---|---|---|---|
| 2015/0039458 A1* | 2/2015 | Reid | G06K 9/00771 |
| | | | 705/26.1 |
| 2017/0316271 A1* | 11/2017 | Saitou | G07G 1/0036 |
| 2018/0232796 A1* | 8/2018 | Glaser | G06Q 30/0635 |
| 2018/0240180 A1* | 8/2018 | Glaser | G06K 9/00771 |
| 2019/0114488 A1* | 4/2019 | Glazer | G06Q 20/206 |
| 2019/0333039 A1* | 10/2019 | Glaser | G06Q 20/208 |
| 2020/0134590 A1* | 4/2020 | Glaser | B60L 53/665 |
| 2020/0184445 A1* | 6/2020 | Biggs | G06Q 20/3821 |

* cited by examiner

HYBRID RETAIL ENVIRONMENTS

BACKGROUND

Traditional physical stores maintain an inventory of items in customer-accessible areas such that customers can pick items from the inventory and take them to a cashier for purchase, rental, and so forth. In other instances, meanwhile, retail environments may include sensors to generate information about events occurring in these facilities. While this information may be helpful to customers and operators of the retail environments, use of the information may be limited when some events within the environments are associated with sensor-generated information and other events are not.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
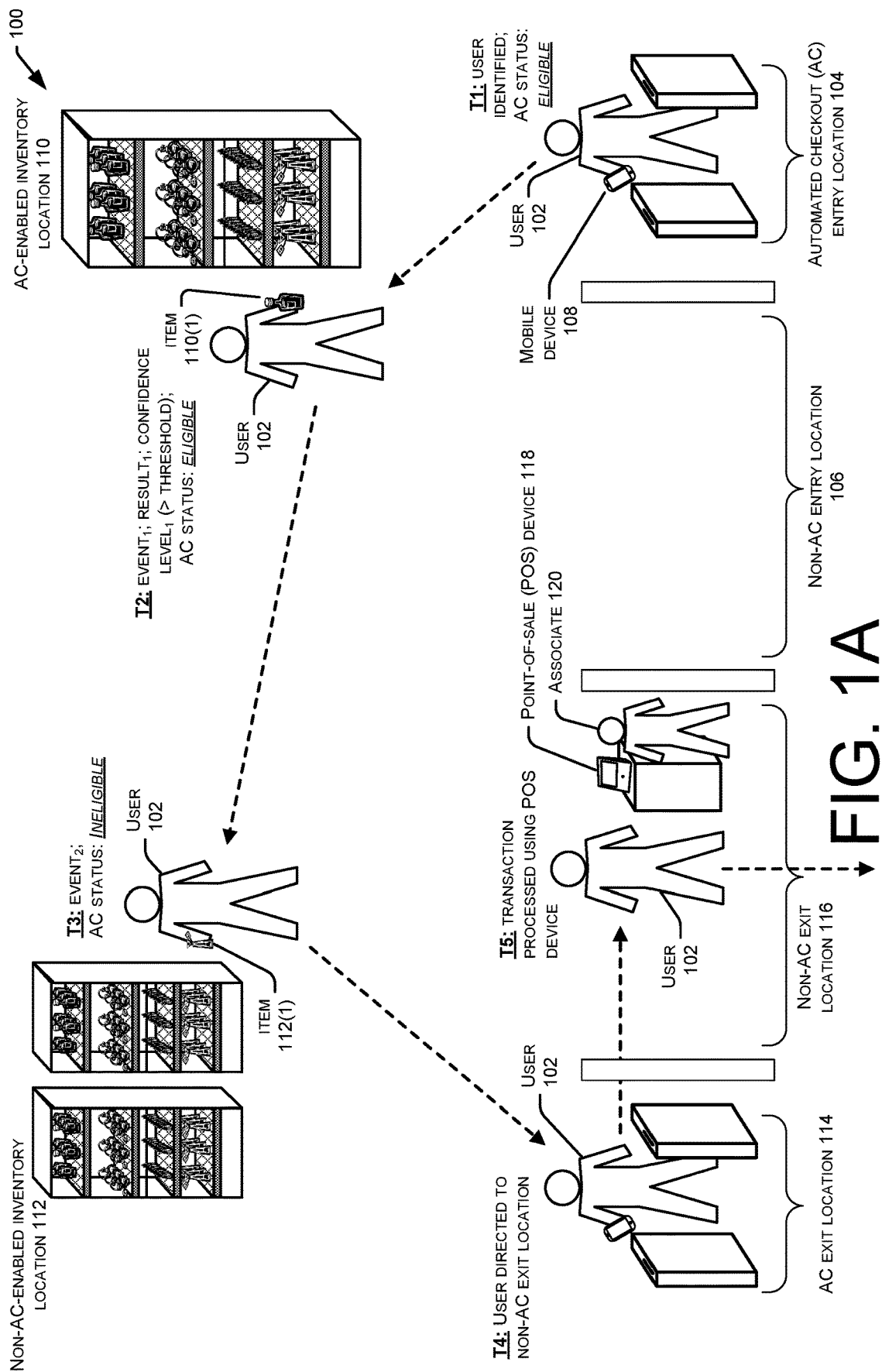
FIG. 1A illustrates an example facility associated with a system for enabling automated checkout (AC) techniques to allow users to enter the facility, pick one or more items, and exit the facility without performing a manual checkout of the items. To do so, the system coupled to the environment may identify an entering user and charge an account associated with the user for a cost of the picked items upon exit of the user. In the example of FIG. 1A, however, a user that enters the facility picks an item from a non-AC-enabled inventory location and, thus, is directed to an exit location at which the an associate of the facility uses a point-of-sale (POS) device to charge an account of the user for one or more of the picked items.

This disclosure describes, in part, systems for enabling physical retail stores and other facilities to implement both automated- and manual-checkout techniques for customers of the stores and/or facilities. For example, the described systems may enable a retail store to implement technology where users are able to pick items from shelves and other inventory locations and exit the store without performing manual checkout of the items, as well as technology to allow users to pay for their items using point-of-sale (POS) and/or other manual-checkout techniques. The systems described herein thus enable hybrid retail facilities, as opposed to a retail facility that is either entirely traditional or entirely enabled for automated checkout.

In some instances, such a facility includes inventory locations housing one or more items that may be picked and/or returned by users. These inventory locations may include automated-checkout (AC) enabled inventory locations as well as non-AC-enabled inventory locations. The AC-enabled checkout locations may be associated with one or more sensors configured to generate sensor data indicative of events that occur with respect to the items housed thereupon. For example, these sensors may generate sensor data indicative of a user picking an item from the AC-enabled inventory location, returning the item to the inventory location, and/or the like. These sensors may include overhead cameras, in-shelf cameras, weight sensors, and/or any other type of sensor configured to generate sensor data indicative of user interactions with the items.

In addition, the inventory locations of the facility may include non-AC-enabled inventory locations. These non-AC-enabled inventory locations may also house items, but be free from sensors configured to identify events occurring at these locations. In some instances, the AC-enabled inventory locations may house items that are pre-packaged and associated with a fixed cost (e.g., beverage containers, canned goods, snack items, clothes, car parts, etc.), while the non-AC-enabled inventory locations may be associated with items that vary in price based on certain criteria, such as weight, volume, toppings, and the like. For instance, within a grocery store, AC-enabled-inventory locations may include shelves holding prepackaged food/beverage items, while non-AC-enabled inventory locations may include a butcher block, deli section, or the like.

In addition to including different inventory locations, the facility may include, in some instances, one or more entry locations for entering the facility and one or more exit locations for exiting the facility. For example, the facility may include a first entry location at which an entering user provides information for identifying an account of the user, and a second entry location at which users enter without providing identifying information. For example, the first entry location may include a scanner or other imaging device at which an entering user scans or otherwise provides a unique code associated with the account of the user, such as a code displayed on a mobile device of the user. Or, the first entry location may include a microphone, camera, or other sensor that generates sensor information at the request of the user for use in identifying the account of the user. In still other instances, the first entry location may include an input device for reading information from a payment card of a user, such as a credit card, debit card, prepaid card, etc. For example, the first entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. The second entry location, meanwhile, may resemble a traditional retail facility entry location to allow users to shop or otherwise interact with items at the retail facility without needing to provide information for identifying user accounts.

Similarly, the facility may include a first exit location where an exiting user provides information for identifying an account of the exiting user, and a second exit location at which users exit without providing identifying information. The first exit location may include, similar to the first entry location, a scanner or other imaging device at which the exiting user scans or otherwise provides a unique code associated with the account of the user, such as the code displayed on the mobile device of the user. Or, the first exit location may include a microphone, camera, or other sensor that generates sensor data at the request of the user for use in identifying the account of the exiting user. The second exit location, meanwhile, may resemble a traditional exit location at a retail facility, including an associate of the facility operating a POS device to manually checkout the exiting user.

Within this example facility, a user may choose to enter the facility using the first, AC-enabled entry location, or may choose to enter the facility using the second, non-AC-enabled entry location. If the user enters through the first entry location and provides information identifying an account of the user, then a system associated with the facility may generate a record indicating the presence of the user at the facility. The record may store an indication of the identity of the user, as well as an indication of whether the user is currently eligible to exit the facility (with items procured by the user) via the AC exit location, or whether the user is only eligible to exit (with the items) via the non-AC exit location, such that the associate of the facility may use the POS device to manually checkout the user. Of course, while this example describes an associate using a POS device to perform the manual checkout, it is to be appreciated that the facility may include self-checkout kiosks or any other technology for enabling manual checkout of the items within the facility and/or proximate the non-AC-enabled exit location.

In addition, sensor data generated from sensors at the facility may be used to determine current positioning of the user, which may also be stored in association with the record of the user. For example, overhead cameras, floor weight sensors, and/or the like may be used to maintain, in the record and at the knowledge and request/consent of the user, the current location of the user within the facility. Further, this sensor data (e.g., image data) may be used to locate the user as the user navigates through the store. Further, if the user interacts within one or more items housed at an AC-enabled inventory location, the system may generate data indicative of the event. This data may comprise result data, indicating a result of the interaction between the user and the item. In some instances, this result data indicates an action taken (e.g., a pick of an item, a return of an item, etc.), an identity of the item acted upon (e.g., a bottle of ketchup, a pair of jeans, etc.), a quantity of the item involved, a location of the item (e.g., aisle, shelf, lane, etc.), and/or the like.

In some instances, the system may generate the result data along with a confidence level indicating a confidence associated with the result data. If the confidence level associated with the result data is greater than a threshold confidence level, then the result data may be associated with an account of the user (e.g., a virtual cart of the user). For example, if the system determines, with a confidence level that is greater than the threshold, that the user picked one bottle of ketchup from an AC-enabled inventory location, then one bottle of ketchup (and its corresponding cost) may be added to the virtual cart of the user. Further, the record associated with the user may continue to indicate that the user is eligible to exit through the AC-enabled inventory location, given that the user is identified and the event that the user performed was determined to be associated with high-confidence result data.

If, however, the confidence level associated with the result data is less than the threshold, then the system may perform one or more additional techniques for determining the result of the event. For example, the system may send sensor data (e.g., image data, weight-sensor data, etc.) to one or more human users for analysis. Further, given that the event is not associated with high-confidence result data, the record associated with the user may be updated to indicate that the user is not eligible to exit through the AC exit location. If, however, the result data is updated to indicate a high-confidence result (e.g., based on the human analysis, etc.), then the record may again be updated to indicate that the user is eligible to exit through the AC exit location, given that the user is identified and associated with high-confidence result data.

Continuing the example, envision that the identified user who is currently eligible to exit through the AC exit location picks an item from or otherwise interacts with a non-AC-enabled inventory location. In some instances, the system may make this determination based on image data captured from overhead cameras or other sensors. Given that this particular inventory location is not associated with automatically determining the results of events that occur thereon, the system may update the record associated with the user to indicate that the user is not eligible to exit through the AC exit location, but instead needs to perform a manual checkout and exit at the non-AC exit location.

In instances where a user is not eligible to exit through the AC exit location, the system may generate notification data indicating at least one of that the user is ineligible to exit through the AC exit location or that the user is eligible to exit through the non-AC exit location (or otherwise needs to perform a manual checkout of at least some of the items procured by the user). In addition, the system may output the notification data to the user. This notification data may comprise visual data, audible data, tactile data, and/or the like. In some instances, the notification data may be sent to a mobile device of the user for display on the mobile device. In addition, or in the alternative, the notification data may be presented on an AC exit gate, in response to the user attempting to exit through the AC exit gate, moving near the AC exit gate, or the like. Of course, while the techniques described herein discuss the user being ineligible to exit through the AC exit gate in some circumstances, it is to be appreciated that the user may choose to disregard this instruction and freely exit through any exit location of the facility. In these instances, the user, who may be unidentified or whose items may be unidentified at that moment, may simply not be charged for one or more of the procured items.

If the user is not eligible to exit through AC exit location, the user may choose to perform a manual checkout of the items at the non-AC exit location. For instance, the user may provide one or more of the items (e.g., the items not currently added to the virtual cart of the user) to an associate of the facility. The associate may use a POS device or the like to identify the items. Thereafter, the user may provide a payment instrument to the associate and/or the POS device for purchasing or otherwise acquiring the items, or the user may thereafter provide the unique code discussed above, which may be associated with an account of the user for purchasing the items.

In instances where the user is eligible to exit through the AC exit location, meanwhile, upon finishing his or her shopping, the user may approach the AC exit location and, in some instances, scan or otherwise provide identifying information to enable the system to identify the exiting user. After scanning his or her unique code at the AC exit gate, for instance, the user may exit the facility. The system, meanwhile, may thereafter charge an account of the identified exiting user for a cost of the items procured by the user within the facility. Of course, while the above example describes the user scanning a unique code (e.g., via a mobile device of the user), it is to be appreciated that the exiting user may be identified based on other sensor data, such as image data, voice data, or the like.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A, instances an example facility 100 associated with a system for enabling automated checkout (AC) techniques to allow users, such as example user 102, to enter the facility 100, pick one or more items, and exit the facility without performing a manual checkout of the items. To do so, the system coupled to the environment may identify an entering user and charge an account associated with the user for a cost of the picked items upon exit of the user.

As illustrated, the example facility 100 includes an AC entry location 104 and a non-AC entry location 106. While the non-AC entry location 106 may comprise a traditional, walk-through entrance to the facility 100, the AC entry location 104 may include an AC entry gate that requests that entering users provide identifying information prior to entering the gate. In the illustrated example, the user 102 enters through the AC entry location 104 by scanning a unique code presented on a mobile device 108 of the user 102 at a scanning device at the entry gate. The entry gate may provide this information to a system, such as an inventory management system discussed in in following figures, which may use this information for identifying the entering user. Of course, while this example describes identifying the user based on the user scanning an unique code presented on the mobile device 108, the system may additionally, or alternatively, identify the user based on voice data (e.g., the user stating his or her name), image data (e.g., image data of a face of the user), password data (e.g., an alphanumeric string), and/or any other type of data. For example, in some instances the facility 100 may include a single entry location, with user identification occurring based on image data of users entering the facility 100. In these examples, those users that have consented/requested to take part in the automatic-checkout techniques may be identified, while the system may refrain from identifying other users entering the facility 100.

Returning to the illustrated example, upon the user 102 entering the facility via the AC entry location 104 at a first time ($T_1$), the system generates a record indicating the presence of the identified user 102 within the facility. This record may be continuously or periodically updated by a locating component of the system to generate current location data of the user within the facility, at the prior consent/request of the user 102. In some instances, the facility 100 includes sensors, such as overhead cameras or the like, that are used to determine the current location of the user 102. In addition, the record generated by the system at $T_1$ may indicate whether the user 102 is eligible to engage in the AC techniques provided by the facility. For example, the record may indicate whether the user 102 is able to "just walk out" with any items he or she collects within the facility without first performing a manual checkout for the items. In this example, at least in part because the system has identified the user 102, the user 102 is eligible at $T_1$ to exit the facility with item(s) without performing manual checkout of the items. In some instances, the system may, additionally or alternatively to the user being identified, store an indication that the user is eligible to exit the facility without performing manual checkout of the items based on the user being associated with a payment instrument. For example, upon identifying the user entering the facility, the system may identify an account of the user may determine whether the account is associated with a valid payment instrument. If so, then the system may store an indication that the user is eligible to exit the facility with one or more items without performing a manual checkout of the items. In another example, the entering user 102 may swipe, scan, or otherwise provide identifying information associated with a payment instrument of the user upon entering the facility. This system may use this identifying information to determine whether the payment instrument is valid (potentially along with a limit of the payment instrument) and may store an indication that the user is eligible to exit the facility without performing manual checkout of the items (assuming the total of the items is less than the limit). In these instances, the system may or may not identify the user 102 but may instead simply associate the user in the facility with the identified payment instrument. In yet another example, the AC-enabled entry location 110 may include a device configured to accept cash, such that a user may input a certain amount of cash and remain eligible for exiting the facility without performing a manual exit so long as the user does not obtain items having a cumulative value (e.g., with taxes, etc.) that exceeds the amount of inserted cash.

As illustrated, in this example the user 102 enters the facility 100 and proceeds to an AC-enabled inventory location 110. As described above, the AC-enabled inventory location 110 may comprise an inventory location within the facility at which result data associated with events may be determined automatically via sensor data. For example, the AC-enabled inventory location 110 may be within the field-of-view of one or more overhead, cameras, in-shelf cameras, or the like, image data from which may be used to determine the results of events that occur at the location 110. In addition, or in the alternative, the inventory location 110 may include one or more other sensors, such as in-shelf weight sensors or the like, which may generate sensor data for identifying the results of the events.

In the illustrated example, at a second time ($T_2$) the user 102 removes (or "picks") an item 110(1) from the AC-enabled inventory location 110. In response, the system may use sensor data indicative of this event to determine result data associated with this event. As illustrated, at $T_2$ the system detects this event (Events), a result of this event (Results), and a confidence level associated with the result (Confidence Level$_1$). The result may comprise an indication of the action (e.g., pick, return, etc.), the identity of the item(s) involved (e.g., ketchup bottle, pair of jeans, etc.), a quantity of the item, an identity of the user, and/or additional data. The confidence level, meanwhile, may indicate a degree to which the system is confident regarding the calculated result. In some instances, the result and the confidence level may be determined using one or more classifiers previously trained using training sensor data and manually labeled results, as described further below. Furthermore, the confidence level may be compared to a threshold and, if the confidence level is greater than a threshold, then the system may update a virtual cart of the identified user based to reflect the calculated result. If, however, the confidence level is less than the threshold, then the system may perform one or more further actions for determining and/or verifying the result and may refrain from updating the virtual cart of a user.

In the illustrated example, at $T_2$ the system determines a result and a confidence level associated that is associated with the result that is greater than the threshold. Thus, the identified item that was determined to be picked by the user 102, in this example, is added to the virtual cart of the user. In addition, because this result was a high-confidence result, the system maintains, in the record associated with the user 102, an indication that the user 102 is still eligible to exit the facility without performing manual checkout of items. Stated otherwise, because the system is confident that the current virtual cart of the user is accurate, the system refrains from updating the record to indicate that the user is ineligible from exiting the facility 100 without performing a manual checkout.

Next, however, at a third time ($T_3$) the user 102 moves to a non-AC-enabled inventory location 112 and picks an item 112(1) from this location 112. As noted above, a non-AC-enabled inventory location may comprise a location within the facility where results of events are not automatically determined. For example, such a location may not be associated with sensors configured to generate data for identifying the events. Or, the size and/or quantity of items picked at these locations may be variable, such that the result is not able to be automatically determined, such as in the example of a butcher or deli section of a grocery store. Of course, while a few examples are described, it is to be appreciated that these locations may be non-AC-enabled for multiple other reasons.

In the illustrated example, the user 102 picks the item 112(1) from the non-AC-enabled inventory location 112. The system may determine that an event occurred (Event$_2$), but may be unable to determine the result of the event. Given that this event is not associated with high-confidence result data, the system may update the record associated with the user to indicate that the user is now ineligible to exit the facility with items without first performing manual checkout of those items.

At a fourth time ($T_4$), in this example the user 102 attempts to exit the facility through an AC exit location 114. The AC exit location 114 may comprise an exit gate at which users provide identifying information for indicating to the system that the corresponding user is exiting the facility. In response, the system may end a shopping session of the corresponding user and charge an account of the user for the cost of the items. For example, similar to the AC entry gate, the AC exit gate may enable users to scan unique codes from their mobile phones or provide any other type of identifying information. In still other instances, users may walk out and the system may identify these users via facial-recognition techniques, in instances where the users have so requested.

In this example, however, because the record associated with the user 102 indicates that the user 102 is ineligible to exit through the AC exit location 114 (at least until the user performs a manual checkout of the items), the system generates and outputs, to the user 102, notification data indicating that the user is to exit through the non-AC exit location 116. This notification data may be output via a mobile device of the user 102, via an exit gate at the AC exit location 114, or in any other audible, visual, and/or tactile manner.

At a fifth time ($T_5$), in this example the user 102 moves to the non-AC exit location 116, which may include a POS device 118 operated by an associate 120 of the facility 120 for performing a manual checkout of any unknown items possessed by the user 102. In this example, for instance, the virtual cart of the user may already include an indication of the item 110(1), but may be free from an indication of the item 112(1) from the non-AC-enabled inventory location 112. As such, the associate (or the user) may use the POS device 118 to scan the item 112(1) and charge an account (e.g., a payment instrument, an account previously associated at the system, etc.) for a cost of the item. Thereafter, the example illustrates the user exiting the facility 100 with the items. Of course, while this example shows the associate 120 performing the manual checkout at the non-AC exit location 116, in other instances the associate 120 may utilize a mobile POS device for scanning items at other locations in the facility, the user 102 may perform a self-checkout via a self-checkout process, or the checkout may be performed in any other manner.

Figure 1B:
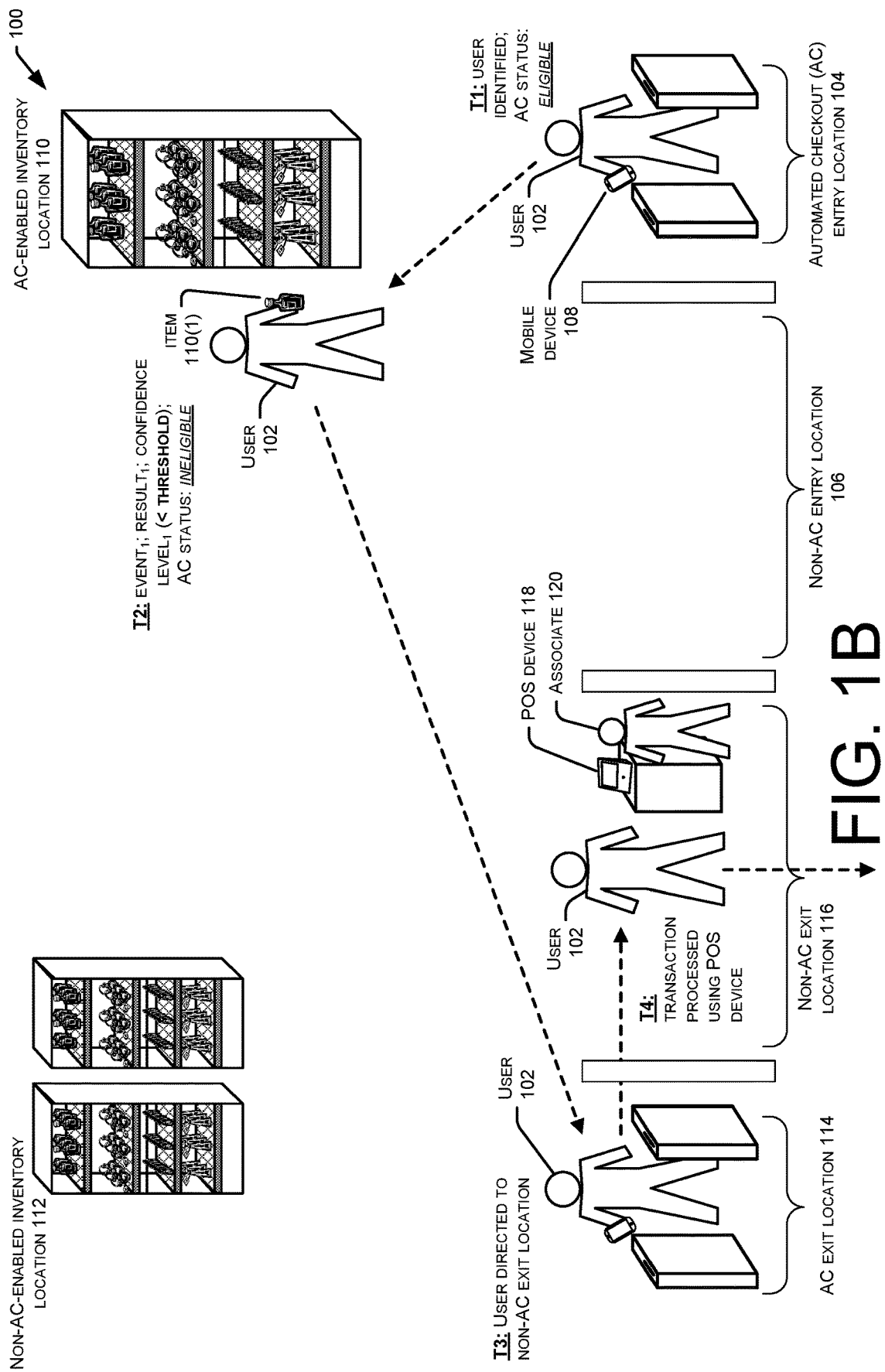
FIG. 1B illustrates the example facility of FIG. 1A. In this example, the user picks an item from an AC-enabled inventory location, but the system configured to identify a result of the event (e.g., the item picked) has calculated a result of the event with a confidence level that is less than a threshold. Thus, the user is directed to the exit location at which the associate of the facility uses a POS device to charge an account of the user.

FIG. 1B illustrates another example within the facility 100 of FIG. 1A. In this example, the user 102 again enters the facility through the AC entry location and scans his or her unique identifier displayed on the mobile device 108. The system thus identifies the user at $T_1$ and generates a record indicating that the user 102 is eligible perform automatic checkout. At $T_2$, the user 102 again picks an item 110(1) from the AC-enabled inventory location 110. In this example, however, the system is unable to generate result data associated with a confidence level that is greater than a threshold. That is, the system may determine a result of the event, but that result may comprise a low-confidence result based on the corresponding confidence level being less than a threshold confidence level.

Because the user 102 is now associated with a low-confidence event, the system updates the record associated with the user 102 to indicate that that the user 102 is no longer eligible to exit the facility 100 with items without first performing a manual checkout of the items. At $T_3$, the system outputs the notification data to the user 102, who performs a manual checkout process and exits the facility at $T_4$.

While FIG. 1B illustrates presenting the notification data to the user 102 upon the user 102 attempting to exit the facility via the AC exit location 114, it is to be appreciated that this notification data may be presented at any other time. For example, the notification data may be sent to and presented upon the mobile device 108 of the user upon the system determining the occurrence of the low-confidence event and/or at any other time prior to exit of the user 102 from the facility. Furthermore, it is noted that if the event were to be upgraded from low-confidence to high-confidence prior to the user 102 exiting the facility, the system may update the record associated with the user 102 yet again, in this example to indicate that the user is now eligible to exit through the AC exit location 114.

Figure 1C:
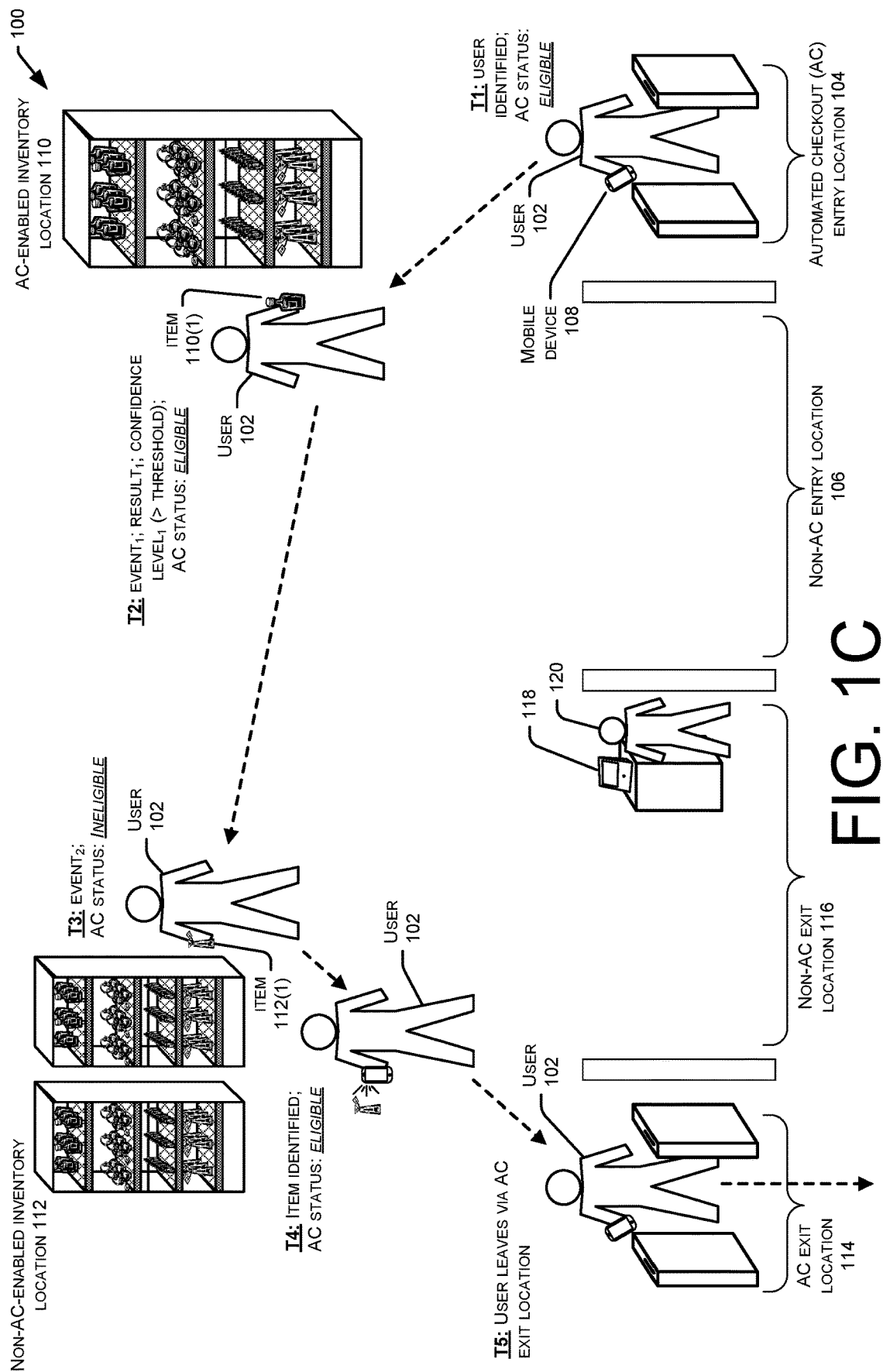
FIG. 1C illustrates the example facility of FIG. 1A. In this example, the user picks a first item from an AC-enabled-inventory and, thereafter, a second item from a non-AC-enabled inventory location. After picking the second item, the system stores an indication that the user is ineligible to leave with the picked items via an AC exit location. However, the second item is thereafter identified and, in response, the system stores an additional indication that the user is now eligible to exit the facility with the picked items via the AC exit location.

FIG. 1C illustrates yet another example scenario within the facility 100. In this example, the user 102 again enters the facility 100 through the AC entry location 104 at $T_1$ and proceeds to pick the item 110(1) at $T_2$. In response, the system may use sensor data indicative of this event to determine result data associated with this event. As described above, at $T_2$ the system detects this event (Events), a result of this event (Results), and a confidence level associated with the result (Confidence Levels). In this example, the confidence level that is associated with the result that is greater than the threshold. Thus, the identified item that was determined to be picked by the user 102, in this example, is added to the virtual cart of the user. In addition, because this result was a high-confidence result, the system maintains, in the record associated with the user 102, an indication that the user 102 is still eligible to exit the facility without performing manual checkout of items. Stated otherwise, because the system is confident that the current virtual cart of the user is accurate, the system refrains from updating the record to indicate that the user is ineligible from exiting the facility 100 without performing a manual checkout.

Next, however, at $T_3$ the user 102 moves to the non-AC-enabled inventory location 112 and picks the item 112(1) from this location 112. In response, the system may determine that an event occurred (Event₂), but may be unable to determine the result of the event. Given that this event is not associated with high-confidence result data, the system may update the record associated with the user to indicate that the user is now ineligible to exit the facility with items without first performing manual checkout of those items.

At $T_4$, however, the item is in fact identified prior to the user 102 exiting the facility 102. For example, the user 102 may use a mobile device 108 or another device in the facility to scan an identifier of the item and send this information to the system. In another example, the system may have processed additional sensor data to determine a high-confidence result of the event, may have received an indication of the result of the event (e.g., the identity of the item) from one or more human users, or may have determined a high-confidence result of Event₂ in any other manner. In one example, when the system determines that a low-confidence result associated with an event, the system may request that the user, associate, or other user verify the result of the event in order to update the result to high-confidence. For example, the system may cause display, on a device in the facility, a screen requesting that the user or associate verify the identity of the item determined by the system, a quantity of the item determined by the system, and/or the like. This screen may be presented on a mobile device of the user, a POS device of the facility, a kiosk in the facility, a display device on a shelf or other inventory location in the facility, a display device on a tote within the facility, and/or on any other device. In response to receiving this information from the user or associate, the system may update the result from low- to high-confidence such that the user 102 is now eligible to exit through the AC exit location.

Given that the user 102 is now associated with the high-confidence result, or rather is no longer associated with any low-confidence results, at this time the system may update the record associated with the user 102 to indicate that the user 102 is again eligible to exit the facility with items without performing a manual checkout. Thus, at $T_5$, the user 102 exits the facility 100 via the AC exit location. Again, this may include scanning a unique code associated with the user at an exit gate, stating a name of the user 102 at an exit gate, simply walking out, or the like.

Figure 1D:
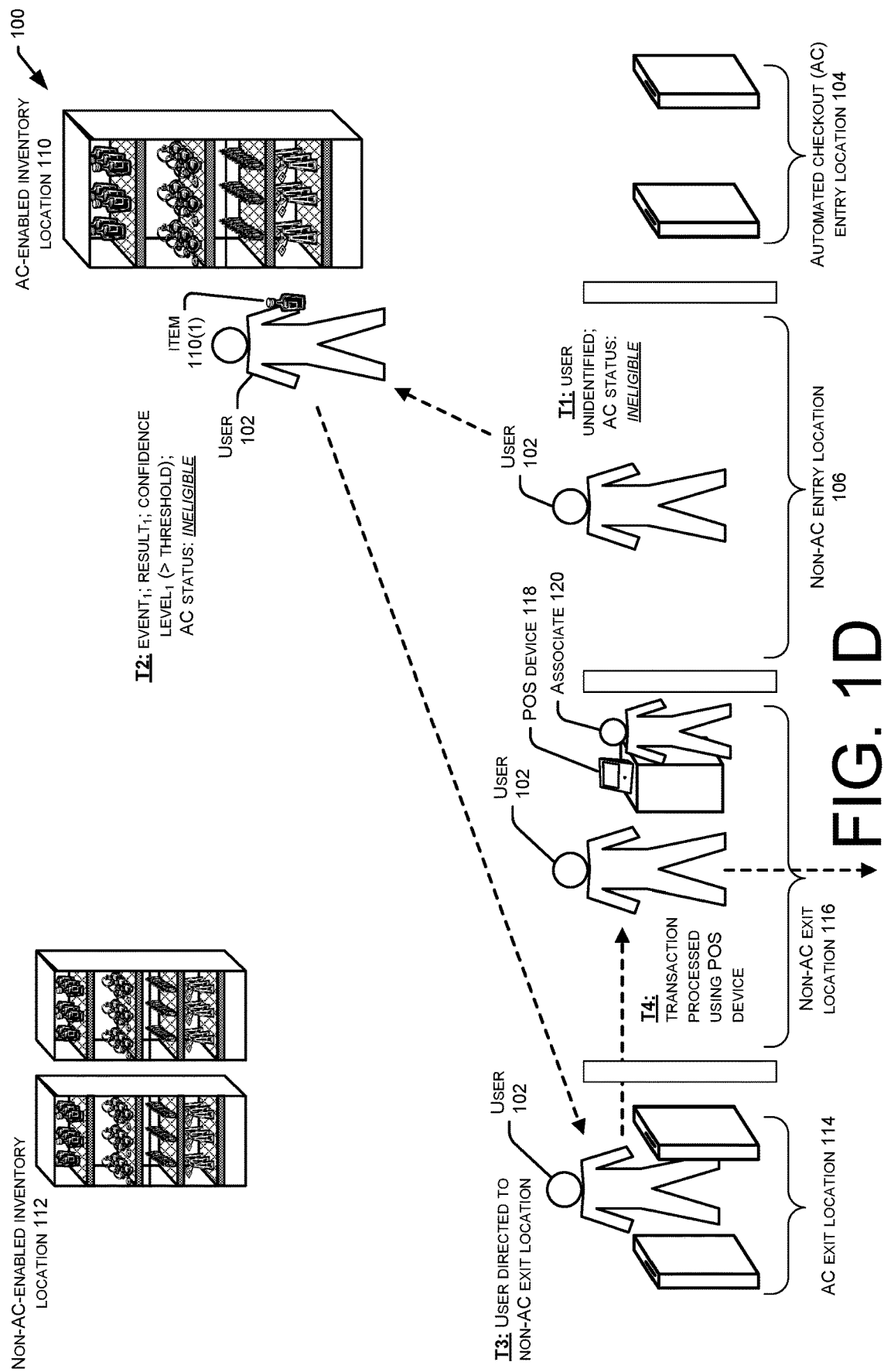
FIG. 1D illustrates the example facility of FIG. 1A. In this example, the user enters the facility via a non-AC entry location. Therefore, the user is unidentified within the system and, thus, is directed to exit the facility through the non-AC exit location such that the user is able to pay for the picked items.

FIG. 1D illustrates another scenario in the facility 100. In this example, the user 102 enters the facility 100 via the non-AC entry location 106. Thus, in this example the user 102 did not provide identifying information and, in turn, the system is unable to identify the user. Therefore, at $T_1$, the system may generate a record associated with the unidentified user and may continue to locate the user within the facility 100, if the user consents and/or requests that the system do so. However, because the user is not identified, and thus the system is unable to locate the account of the unidentified user 102, the record indicates that the user 102 is not eligible to exit with items without performing a manual checkout of the items.

At $T_2$, the unidentified user 102 picks the item 110(1) from the AC-enabled inventory location 110. Again, the system may determine a result of the event, but still does not know the identity of the user. Thus, the record associated with the user 102 continues to indicate that the user is ineligible to exit without performing manual checkout, even if the result of the event (other than the identity of the user) is high-confidence. Similar to the example above, at $T_3$ the system may output notification data directing the user 102 to the non-AC exit and, at $T_4$, the user 102 and/or the associate 120 may perform a manual checkout of the items prior to the user 102 exiting the facility at $T_4$. It is to be appreciated, however, that if system were to identify the user 102 prior to the user exiting the facility 100 (e.g., using facial-recognition techniques, the user scanning his or her unique code, etc.), the system may have updated the record to indicate that the user is eligible to exit the facility with one or more items via the AC exit location 114.

Figure 1E:
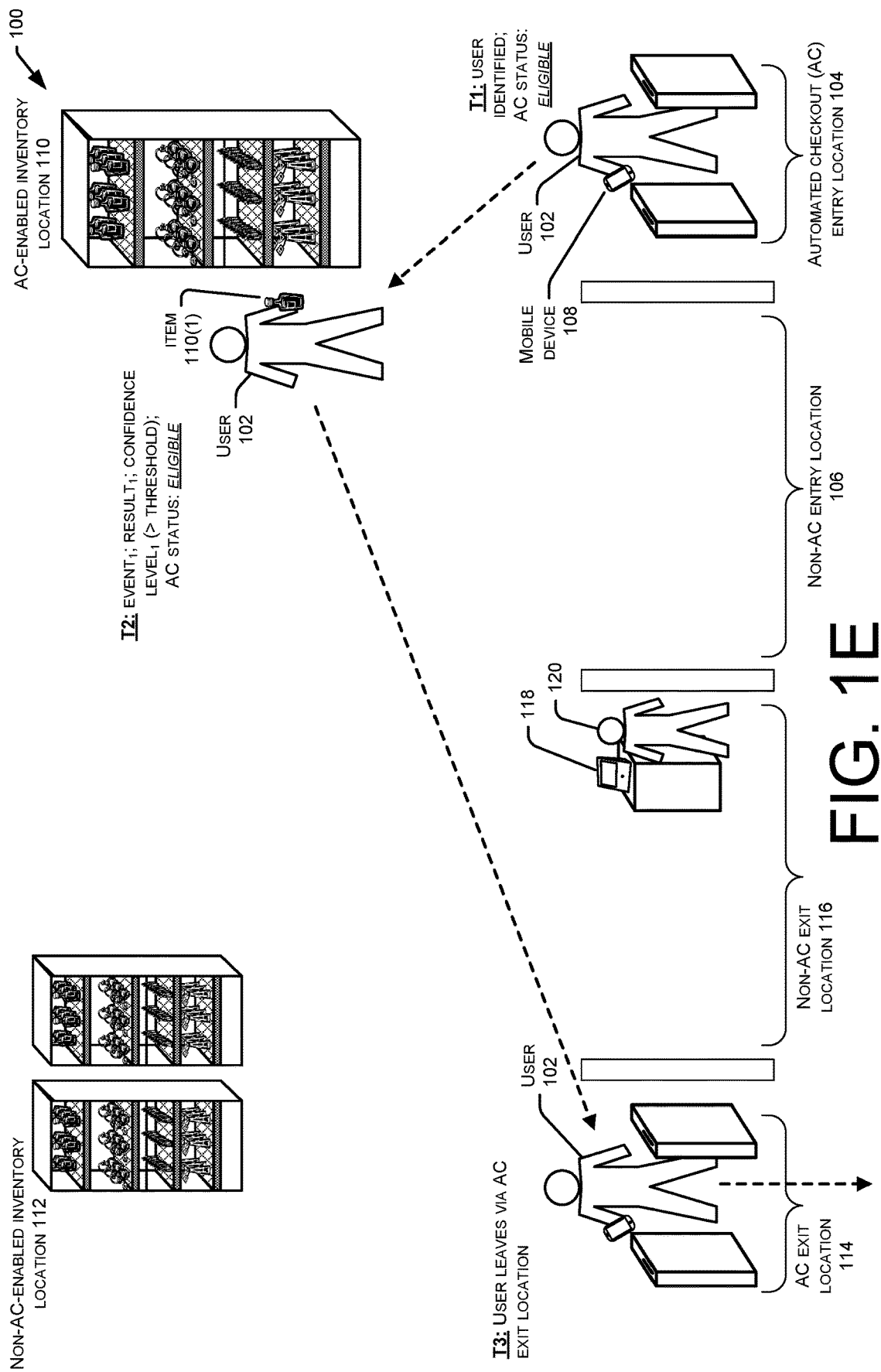
FIG. 1E illustrates the example facility of FIG. 1A. Here, the user enters through the AC entry location (and, thus, is identified), picks an item from an AC-enabled inventory location (which the system identifies with a confidence level that is greater than a threshold), and exits the facility through the AC exit location. Therefore, in this example scenario, the user is able to automatically exit the facility without performing a manual checkout of the picked items.

FIG. 1E illustrates yet another example scenario with the facility 100. In this example, at $T_1$ the user 102 enters through the AC entry location 104 and is identified. Thus, the system generates the record indicating that the user 102 is eligible to exit through the AC exit location. At $T_2$, the user picks the item 110(1), and the system uses the sensor data to determine the result with a confidence level that is greater than the threshold. Thus, the system maintains the indication in the record that the user 102 is eligible to exit through the AC location. At $T_3$, the user 102 attempts to exit the facility at the AC exit location 114 by, for example, scanning his or her unique code at an exit gate or otherwise providing identifying information, or by simply exiting the facility without scanning or providing identifying information. In response to receiving this information, the system may identify the record associated with the user 102, determine that the user 102 is eligible to "just walk out", and charge an account of the user for the items listed on the virtual cart of the user.

Figure 2:
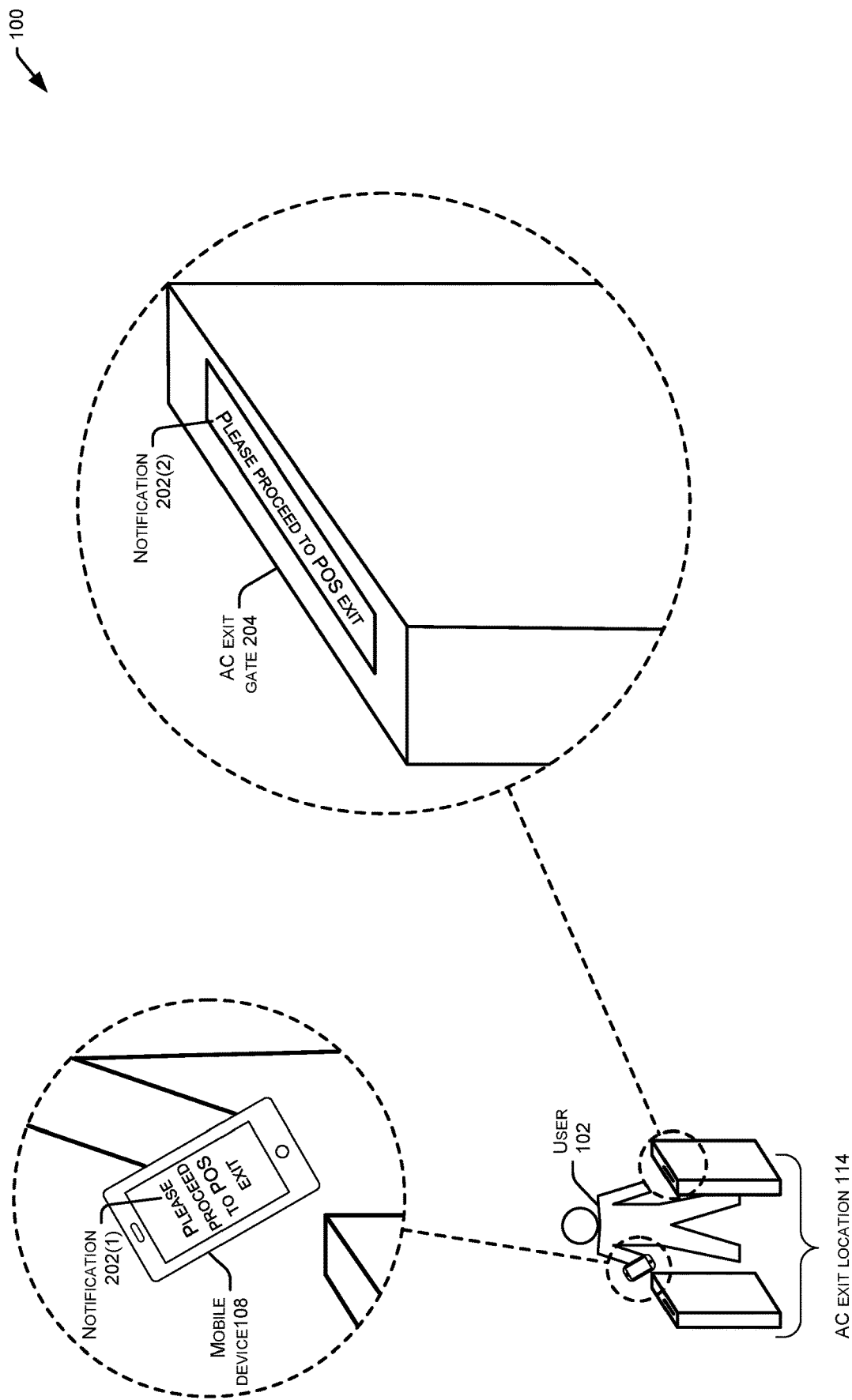
FIG. 2 illustrates an example notification that the system may provide to the user, instructing the user to exit the facility via the non-AC exit location. As illustrated, the notification may be presented on a mobile device of the user, at an AC exit gate, or via another means.

FIG. 2 illustrates an example notification that the system may provide to the user 102, instructing the user 102 to exit the facility via the non-AC exit location. As illustrated, a notification 202(1) may be presented on a mobile device 108 of the user 102 in some instances. The notification 202(1) may indicate one or more of that the user 102 is ineligible to exit, with items, through an AC exit gate 204, that the user 102 should proceed to the non-AC exit location, that one or more items possessed by the user 102 have not been identified, that the user 102 is to perform a manual checkout of one or more items, or the like. Furthermore, in addition, or in the alternative, to presenting the notification 202(1) on the mobile device 108, the system may present a notification 202(2) at the AC exit gate 204, such as on a display of the exit gate or the like.

Of course, while a few example notifications are illustrated and described, it is to be appreciated that the system may provide any other type of notification at any time or location to the user 102. For example, while FIG. 2 illustrates example visual indications, in other instances the notification may be output via a speaker of the mobile device 108, a speaker at the AC exit gate 204, or in any other audible, visual, or tactile manner. In addition, or in the alternative, a notification may be provided to an associate of the facility, such as the associate 120 discussed above with reference to FIGS. 1A-E. For example, upon an ineligible user exiting or attempting to exit via the AC exit gate 204, notification data may be sent ao POS or other computing device of the associate, who may choose to request that the user exit through the non-AC exit gate after paying for the items. Of course, it is to be appreciated that this notification may be provided to the associate via any other suitable medium.

Furthermore, in some instances the AC exit gate 204 may include one or more physical gates, which may refrain from opening unless the user attempting to exit has been designated as eligible to exit via the AC exit gate 204. In these instances, the notification may be provided by the gate refraining from opening, in addition or in the alternative to notification data being displayed to a user and/or associate of the facility.

Figure 3:
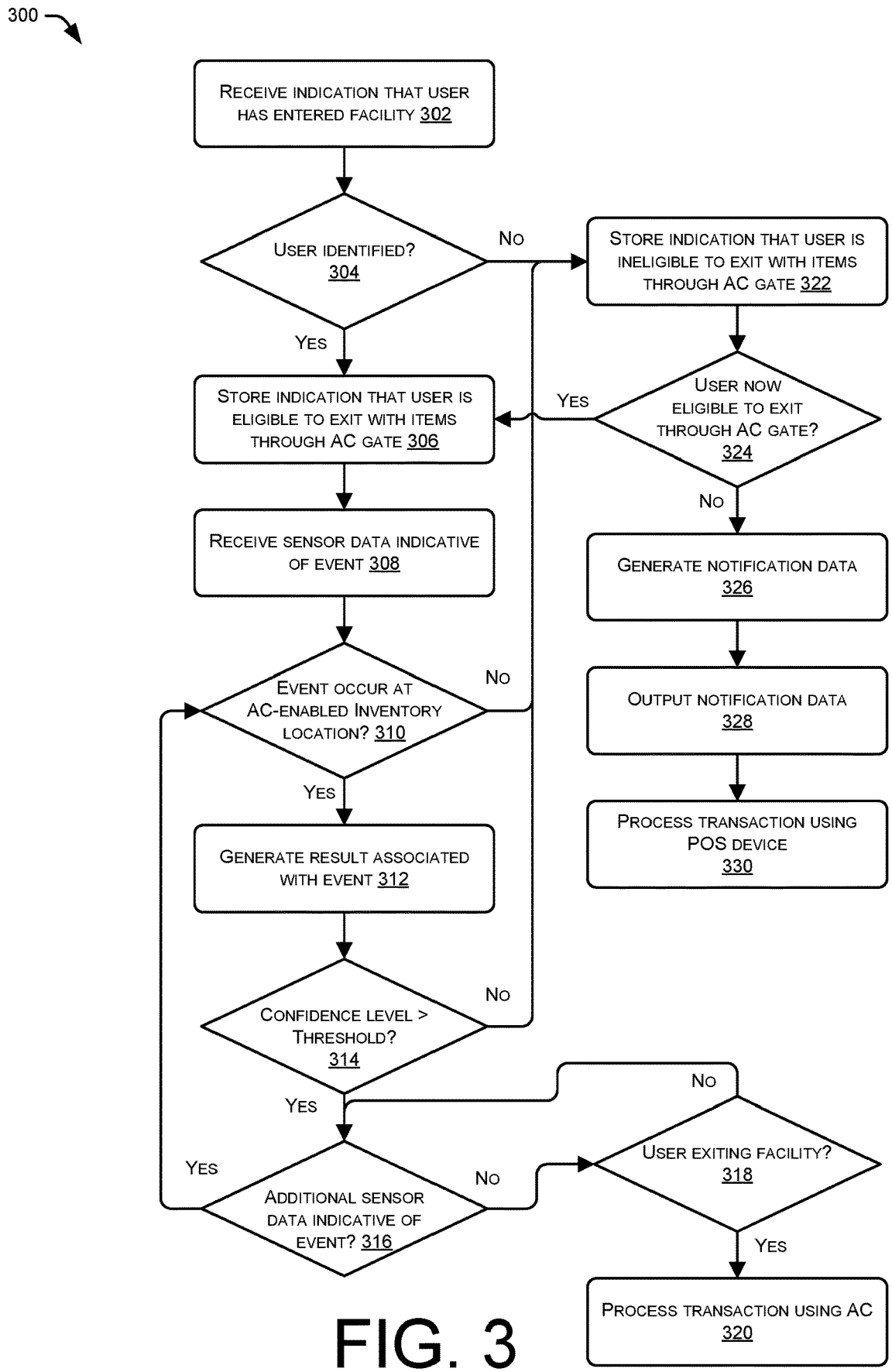
FIG. 3 illustrates an example process for determining whether a user is eligible to exit a facility with one or more items without performing a manual checkout of the one or more items.

FIG. 3 illustrates an example process 300 for determining whether a user is eligible to exit a facility with one or more items without performing a manual checkout of the one or more items. This process, and other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At 302, a system coupled to one or more sensors in a facility receive an indication that a user has entered the facility. For example, the system may receive an indication that a user has scanned identifying information, such as a unique code presented on a mobile device of the user, at a scanning device at an entry location of the facility. In another example, the received indication may be based on image data captured by one or more cameras located at the facility, with the image data showing the user entering the facility. In still another example, the indication may be based on weight sensors on a floor of the facility identifying an entering user, voice data of the entering user, or the like.

At 304, the system determines whether the user has been identified. In the examples of FIGS. 1A-E, for instance, the system may determine whether the user provided identifying information and entered through the AC entry location 104, or whether the user simply walked through the non-AC entry location 106 without providing identifying information. In the former instances, the system may use the identifying information (e.g., provided at a scanning device on the entry gate) to determine that the user has been identified, and to determine the identity of the user. In the latter instances, the system may determine that the user has not been identified. In another example, the system may determine whether the user is identified using sensor data captured by one or more overhead cameras, floor-based weight sensor, and/or the like. Of course, as is true for each of the identification techniques described herein, any user identification is only to occur at consent of the entering user(s).

If the system determines at 304 that the user is identified, then at 306 the system stores an indication that the user is eligible to exit, with one or more procured items, through the AC exit gate. For example, the system may generate a record associated with the identity of the user and indicating that the user is eligible to exit the facility without performing a manual checkout of any items he or she procures within the environment. The record may also be continuously or periodically updated by the system to store an indication of a current location of the user in the facility (at the consent/request of the user).

At 308, the system receives sensor data indicative of an event within the facility that many involve the user. For example, the system may receive image data depicting the user interacting with an inventory location, may receive weight-sensor data showing a change in weight at an inventory location proximate the current location of the user, and/or may receive any other type of sensor data generated by any other type of sensor within the environment.

At 310, the system may determine whether the event occurred at an AC-enabled inventory location. That is, the system may determine whether the event is associated with a location in the facility in which events may be processed automatically using sensor data, such that the result of any such event may be used to update a virtual cart of a user without further interaction by human associates.

If the system determines at 310 that the event occurred at an AC-enabled inventory location, then at 312 the system may generate result data indicating a result of the event and may determine, at 314, whether the result data is associated with a confidence level that is greater than a threshold. For instance, the system may provide the sensor data and/or additional data into one or more trained classifiers, which may output the result data indicating data such as an action associated with the event (e.g., pick, return, etc.), an item associated with the item, a quantity of the item, and/or the like. In addition, the one or more classifiers may output a confidence level indicating a degree of accuracy of the result data.

If the system determines that the confidence level is greater than the threshold, then the system may update a virtual cart of a user to indicate the result, such as update the virtual cart to indicate that the user has picked a single bottle of a certain brand of ketchup associated with a particular price. In addition, at 316 the system may determine whether additional sensor data indicative of an event has been received. If so, then the process 300 may return to 310. If not, then the process may proceed to 318, which represents whether the system has received data indicative of the user exiting facility. As described above, this data may include an indication that the user has scanned their unique code at an exit gate, image data of the user exiting the facility, weight-sensor data indicative of the user exiting the facility, or the like. If not, then the process 300 illustrates that may return to determining whether additional sensor data has been received, and so forth.

If, however, the system does determine that the user is exiting (or has exited the facility), then at 320 the system may process a transaction with the user using automatic-checkout techniques. That is, the system may identify a payment instrument or other account previously associated with an account of the user in the system and may use this payment instrument or account information to charge the user for a cost of the acquired items. Thus, the user has been able to purchase (or otherwise acquire) items from the facility by simply walking into the facility, procuring one or more items, and walking out of the facility (potentially along with providing identifying information upon entry and/or exit of the facility).

Returning to 304, however, if the system determines that the entering user has not been identified (e.g., because the user entered without providing identifying information), then at 322 the system stores an indication that the user is ineligible to exit the facility, with items, via the AC exit gate. That is, the system may generate the record associated with the user, described above, but in this instance may associate an indication that the user is ineligible to exit the facility, with items, without first performing a manual checkout of the items. Again, even though this generated record may indicate that the user is "unidentified", the record may be used by the system to continuously or periodically update the location of the user in the facility (at the consent/request of the user).

In addition to the above, even if a user is identified the system may, at 322, update the record to indicate that the user is ineligible to exit, with items through the AC exit gate if the system determines at 310 that the event indicated by the sensor data received at 308 has not occurred at an AC-enabled inventory location. That is, because the event has occurred at a location for which results are not automatically calculated for corresponding events, the system may indicate that the user now needs to perform a manual checkout of at least one item prior to exiting the facility with that item.

Furthermore, even if an identified user engages in an event at an AC-enabled location, if, at 314, the system determines that the confidence level is not greater than the threshold, then the system may also store the indication that the user is ineligible to leave the facility with items without performing manual checkout.

In instances where the system stores, at 322, the indication that the user is ineligible to exit the facility, with one or more items, without performing a manual checkout, the system may, at 324, determine whether the user is now eligible to do so. For example, if the system identifies a previously unidentified user, and if any events associate with the record of the user are associated with high-confidence results, then the system may proceed to 306 to update the record of the user to indicate that he or she is now eligible to exit via the AC exit gate. Additionally, or alternatively, if a result associated with an event of the user moves from low confidence to high confidence, then the system may update record of the user to indicate that the user is able to exit via the AC exit gate. This may occur, for example, in instances where the user uses his or her mobile device to scan an item that was previously associated with a low-confidence event, in instances where one or more human users perform an analysis of sensor data associated with the event prior to exit of the user from the facility, or the like.

If, however, the system does not update the record of the user to indicate that he or she is not eligible for exit via the AC exit location, then at 326 the system may generate notification data indicating at least one of that the user is ineligible to exit through the AC exit location or that the user is to perform a manual checkout of one or more items (at the non-AC exit location) prior to exiting the facility with the procured items.

Next, at 328, the system may output the notification data, such as to at least one of the user, an associate of the facility, or the like. This may include sending a visual, audible, or tactile indication to a mobile device of the user, sending a visual, audible, or tactile indication for output at an exit gate of the facility, or the like. Finally, at 330, the system may process a transaction between the user and the facility based on transaction data received from a POS device. For instance, an associate of the facility may operate the POS device to charge the user for the procured items, and may send this information to the system or another system. In another example, the user may use his or her mobile device as a POS device for processing the transaction.

Figure 4:
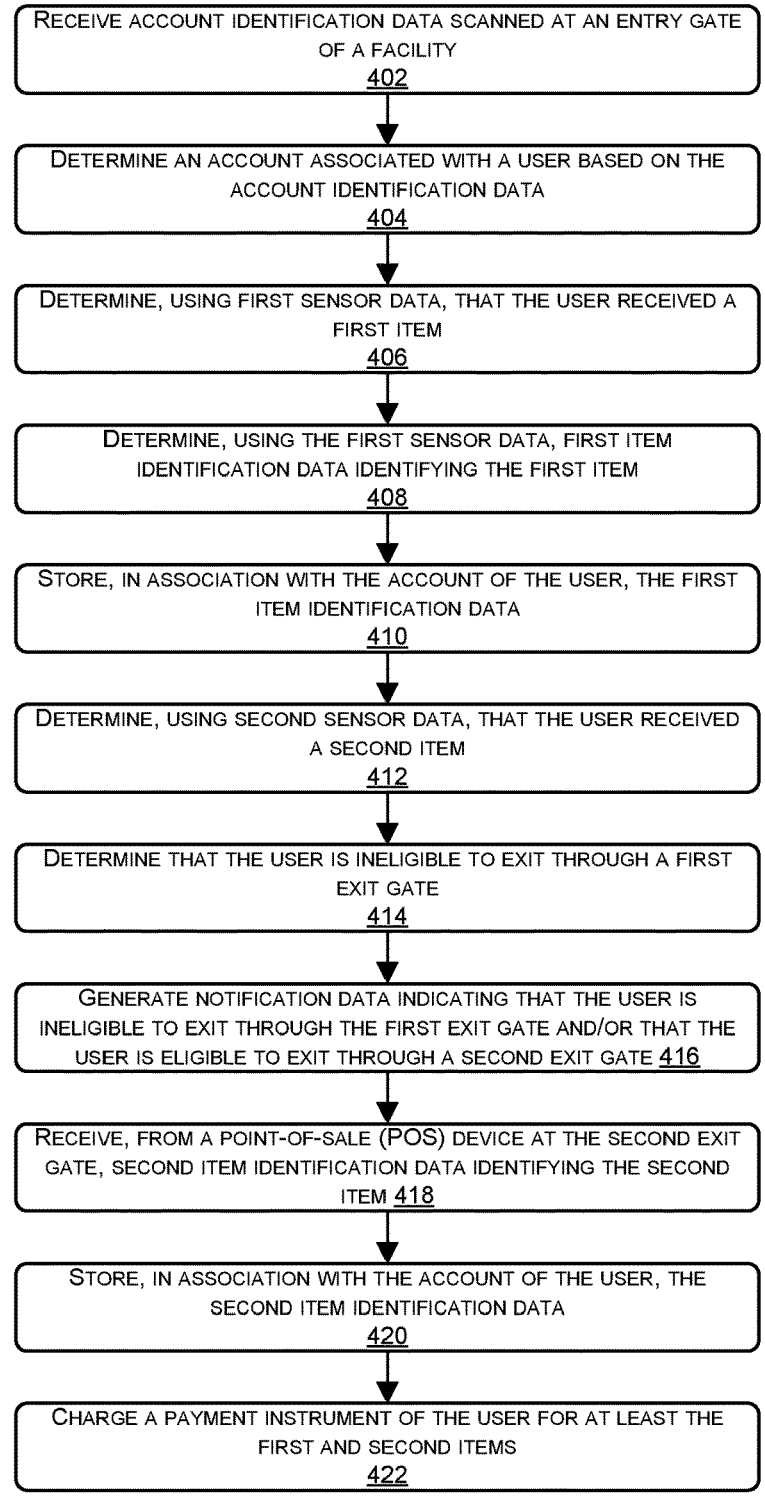
FIG. 4 illustrates an example process for, in part, determining that a user is ineligible to exit through a first exit gate, generating notification data requesting that the user exit through a second exit gate, and charging a payment instrument of the user based on data received from a POS device at the second exit gate.

FIG. 4 illustrates an example process 400 for, in part, determining that a user is ineligible to exit through a first exit gate, generating notification data requesting that the user exit through a second exit gate, and charging a payment instrument of the user based on data received from a POS device at the second exit gate. At 402, the system described above may receive account identification data scanned at an entry gate of a facility. For example, the system may receive an indication that a user used a mobile device of the user to scan a code presented on the device at the entry gate. At 404, the system may, in response, determine an account of the user using the account identification data. That is, the system may map the account identification data to a unique account at the system associated with the user that entered the facility.

At 406, the system may determine, using first sensor data, that the user obtained a first item. For example, the sensor data may comprise image data, weight-sensor data, or any other type of data that may indicate that the user picked an item from an inventory location, received an item from another user in the facility, or otherwise obtained an item while in the facility. At 408, the system determines, using the first sensor data, first item identification data identifying a first item obtained by the user. For example, the system may input the sensor data and/or additional data into one or more trained classifiers for determining the first item identification of the first item. At 410, the system stores, in association with the account of the user, the first item identification information. For example, the system may store, in the account, an indication that the user has not picked or otherwise received the first item. In some instances, this indication is stored based at least in part on the result of the event being associated with a high confidence. Further, the system may maintain, for the user, the indication that the user is eligible the facility, with items, without first performing a manual checkout of the items.

At 412, the system determines, using second sensor data, that the user obtained a second item. In this instance, however, the result data that the system calculates may have a confidence level that is less than a threshold. Thus, the system may refrain from storing an indication of a second item, or an action taken with respective to an item, to a virtual cart of the user. Further, at 414, the system may determine that the user is now ineligible to exit the facility, with items, through the AC exit location. The system may also update the record associated with the user to indicate that the user is ineligible to "just walk out".

Furthermore, at 416, the system may generate notification data indicating at least one of that the user is ineligible to exit through the AC exit gate or that the user is eligible to exit through the non-AC exit location. At 418, the system may receive, from a POS device, second item identification data identifying the second item. In response, the system may update the account of the user to indicate the addition of the second item. In addition, at 422, the system may charge a payment instrument or other account for a cost of the acquired items.

Figure 5:
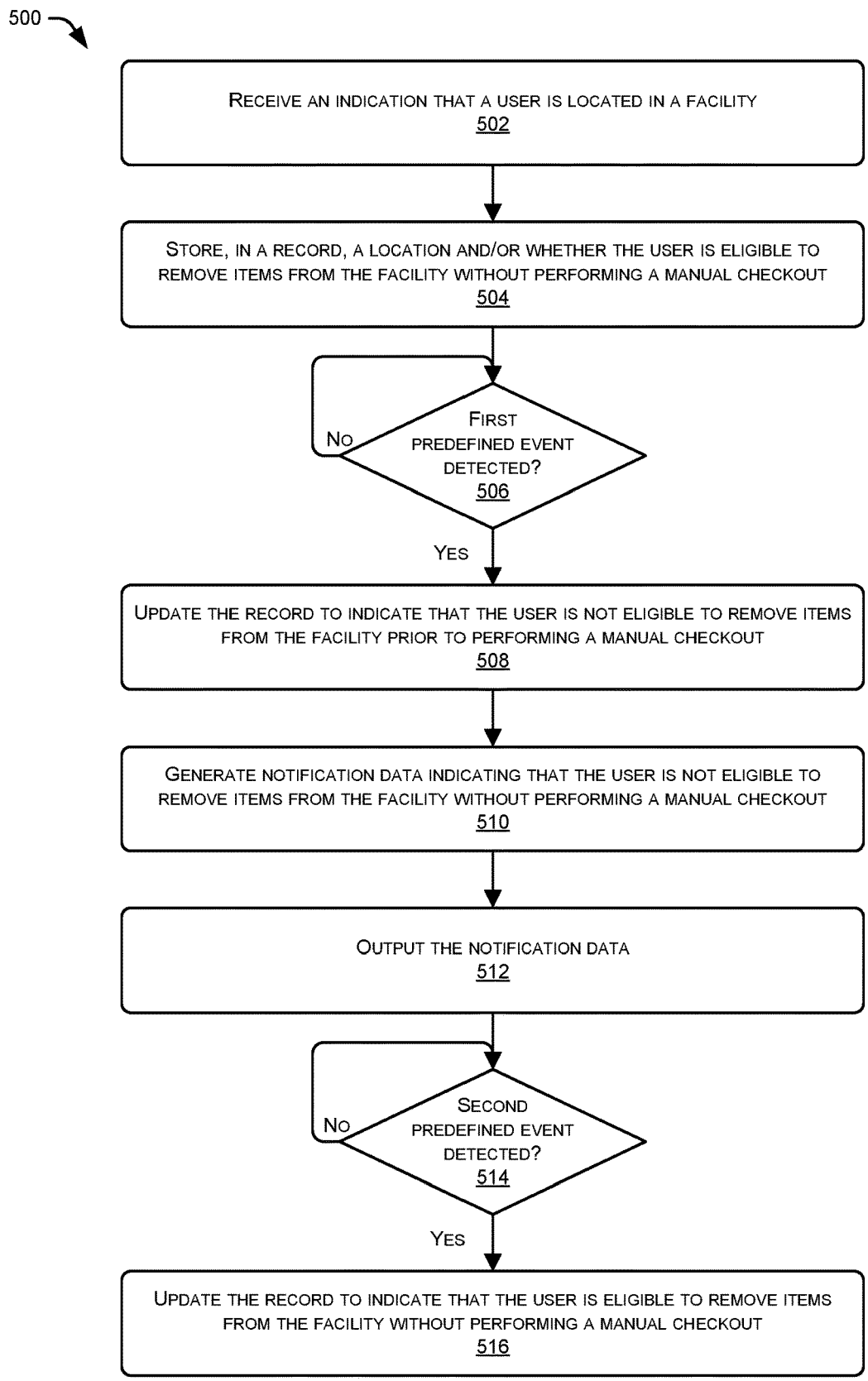
FIG. 5 illustrates an example process for generating and updating a record indicating whether a user within a facility is eligible to exit a facility with one or more picked items without performing a manual checkout of the items.

FIG. 5 illustrates an example process 500 for generating and updating a record indicating whether a user within a facility is eligible to exit a facility with one or more picked items without performing a manual checkout of the items. At 502, the system again receives an indication that a user is located in a facility, using any one or more of the techniques described above. At 504, the system stores, in a record associated with the user, at least one of a current location of the user or whether the user is eligible to remove items from the facility without performing a manual checkout of the items. This may include, for instance, generating and/or updating a record associated with the user indicating a location of the user and whether the user is eligible to remove items from the facility without performing a manual checkout of the items.

At 506, the system determines whether occurrence of a predefined event has been detected. If not, then the system continues to monitor for such a predefined event. If so, then the system may update the record to indicate that the user is not eligible for exiting the facility with items without performing a manual checkout of the items. In some instances, the predefined event may comprise a user acquiring an item from a non-AC-enabled inventory location, as described above with reference to FIG. 1A. In other instances, the predefined event may comprise the user engaging in an event that becomes associated with low-confidence, rather than high-confidence, result data. For instance, the user may engage in an event associated with a low-confidence event or may engage in an event that is initially associated with a high-confidence result that the system later designates to low-confidence prior to the user exiting the facility. In yet other instances, the predefined event may comprise the system losing track of the user or the identity of the user while in the facility.

In other examples, the predefined event may comprise an event that requires additional authorization and/or identification of the user. For example, if the user has picked one or more items having a combined cost that is greater than a threshold, then the system may determine that the user is to provide verification of his or her identity (e.g., by showing an official identification to an associate at the facility) and, thus, is currently ineligible to exit via the AC-inventory location. In another example, if the user picks a number of items that is greater than a threshold, or has picked a particular item (e.g., alcohol, etc.), then then the system may determine that the user is to provide verification of his or her identity and, thus, is currently ineligible to exit via the AC-inventory location. In another example, if the system determines that the user has visited the facility a number of times (e.g., five) within a threshold amount of time (e.g., a single business day), then the system may again determine that the user is ineligible to exit through the AC-enabled exit location until the user provides additional verification.

In still other instances, a user that has entered the facility may be associated with a payment instrument (e.g., credit card, debit card, prepaid card) associated with a predefined limit (e.g., $20, $1,000, etc.). For instance, the user may have scanned or otherwise provided identifying information associated with the payment instrument upon entering the facility, or the system may have determined the payment instrument associated with the user after identifying the user in another way. In these instances, upon a virtual cart reaching a total cost the nears, reaches, or exceeds the limit of the payment instrument, the system may determine that the user is ineligible to exit the facility without performing a manual checkout of his or her items.

Of course, while a few examples are provided, it is to be appreciated that other predefined events may occur that cause the system to update the record associated with the user.

At 510, the system may generate notification data indicating that the user is not eligible to exit the facility with items prior to performing manual checkout of the items. At 512, the system may output this notification data (e.g., to the user, an associate of the facility, etc.) audibly, visually, tactilely, or in any other manner. Furthermore, the system may output this data in response to the system updating the record of the user at 508, in response to the user attempting to exit the facility through AC exit location, or in response to any other event.

At 514, the system determines whether a second predefined event has occurred. If so, then at 516 the system may again update the record of the user to indicate that the user is now eligible to exit the facility without performing a manual checkout of any items procured by the user from the facility. In some instances, the second predefined event may comprise the system identifying (or re-identifying) the user within the facility, result data associated with an event of the user being changed from low-confidence to high-confidence, or the like. For instance, a user or an associate of the facility may scan a barcode of an item (e.g., using a mobile device of the user, a store device, etc.) to identify an item associated with a low-confidence event. In another example, the user or the associate may be presented, on a mobile device or the user, a POS device, or the like, a confirmation screen asking the user or associate to confirm the identity of the user, selection of which may comprise the second predefined event for updating the record for indicating that the user is now eligible to exit the facility without performing a manual checkout. In still another example, the second predefined event may comprise an associate of the facility verifying the age (e.g., by checking a user's driver license or other identification) of a user that picked an age-restricted item. In still another example, the user performing a manual checkout of the items (e.g., via a POS device of the facility, the user's mobile device, or the like) may comprise the second predefined event such that the user is now eligible to exit through the AC exit gate. Furthermore, in some instances the system may generate and output, to the user, additional notification data indicating that the user is now eligible to exit the facility without performing a manual checkout.

Figure 6:
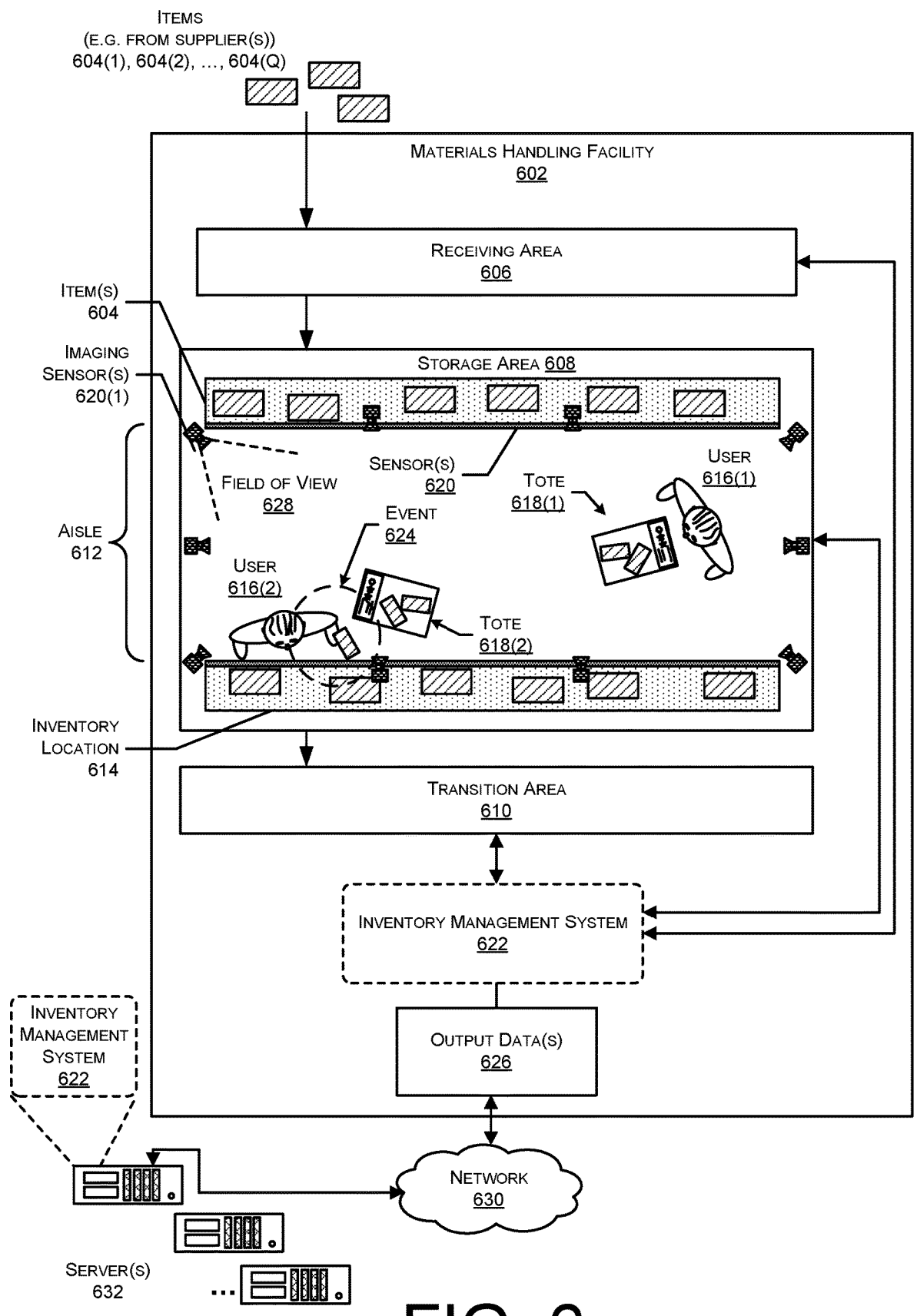
FIG. 6 is a block diagram of an example materials handling facility that includes sensors and an inventory management system configured to generate output regarding events occurring in the facility using the sensor data.
Figure 7:
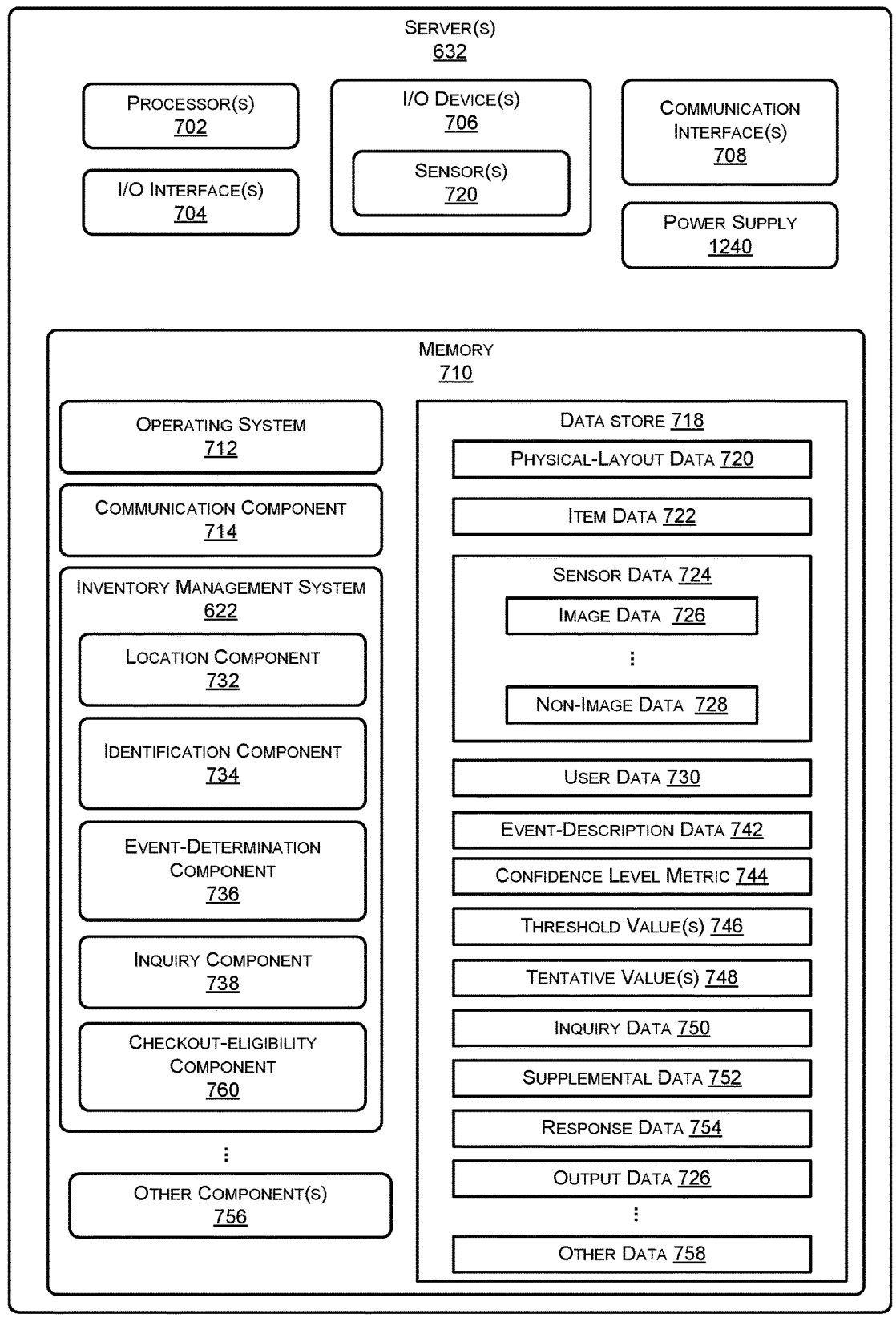
FIG. 7 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 6 and 7 represent an illustrative materials handing environment, such as the materials handling facility 602, in which the techniques described herein may be applied to cameras monitoring the environments as described below. However, the following description is merely one illustrative example of an industry and environment in which the techniques described herein may be utilized. The materials handling facility 602 (or "facility") comprises one or more physical structures or areas within which one or more items 604(1), 604(2), . . . , 604(Q) (generally denoted as 604) may be held. As used in this disclosure, letters in parenthesis such as "(Q)" indicate an integer result. The items 604 comprise physical goods, such as books, pharmaceuticals, repair parts, electronic gear, groceries, and so forth.

The facility 602 may include one or more areas designated for different functions with regard to inventory handling. In this illustration, the facility 602 includes a receiving area 606, a storage area 608, and a transition area 610. The receiving area 606 may be configured to accept items 604, such as from suppliers, for intake into the facility 602. For example, the receiving area 606 may include a loading dock at which trucks or other freight conveyances unload the items 604.

The storage area 608 is configured to store the items 604. The storage area 608 may be arranged in various physical configurations. In one implementation, the storage area 608 may include one or more aisles 612. The aisle 612 may be configured with, or defined by, inventory locations 614 on one or both sides of the aisle 612. The inventory locations 614 may include one or more of shelves, racks, cases, cabinets, bins, floor locations, or other suitable storage mechanisms for holding or storing the items 604. The inventory locations 614 may be affixed to the floor or another portion of the facility's structure, or may be movable such that the arrangements of aisles 612 may be reconfigurable. In some implementations, the inventory locations 614 may be configured to move independently of an outside operator. For example, the inventory locations 614 may comprise a rack with a power source and a motor, operable by a computing device to allow the rack to move from one location within the facility 602 to another.

One or more users 616(1), 616(2), . . . , 616(U), totes 618(1), 618(2), . . . , 618(T) (generally denoted as 618) or other material handling apparatus may move within the facility 602. For example, the users 616 may move about within the facility 602 to pick or place the items 604 in various inventory locations 614, placing them on the totes 618 for ease of transport. An individual tote 618 is configured to carry or otherwise transport one or more items 604. For example, a tote 618 may include a basket, a cart, a bag, and so forth. In other implementations, other agencies such as robots, forklifts, cranes, aerial drones, and so forth, may move about the facility 602 picking, placing, or otherwise moving the items 604.

One or more sensors 620 may be configured to acquire information in the facility 602. The sensors 620 in the facility 602 may include sensors fixed in the environment (e.g., ceiling-mounted cameras) or otherwise, such as sensors in the possession of users (e.g., mobile phones, tablets, etc.). The sensors 620 may include, but are not limited to, cameras 620(1), weight sensors, radio frequency (RF) receivers, temperature sensors, humidity sensors, vibration sensors, and so forth. The sensors 620 may be stationary or mobile, relative to the facility 602. For example, the inventory locations 614 may contain cameras 620(1) configured to acquire images of pick or placement of items 604 on shelves, of the users 616(1) and 916(2) in the facility 602, and so forth. In another example, the floor of the facility 602 may include weight sensors configured to determine a weight of the users 616 or other object thereupon.

During operation of the facility 602, the sensors 620 may be configured to provide information suitable for tracking how objects move or other occurrences within the facility 602. For example, a series of images acquired by a camera 620(1) may indicate removal of an item 604 from a particular inventory location 614 by one of the users 616 and placement of the item 604 on or at least partially within one of the totes 618.

While the storage area 608 is depicted as having one or more aisles 612, inventory locations 614 storing the items 604, sensors 620, and so forth, it is understood that the receiving area 606, the transition area 610, or other areas of the facility 602 may be similarly equipped. Furthermore, the arrangement of the various areas within the facility 602 is depicted functionally rather than schematically. For example, multiple different receiving areas 606, storage areas 608, and transition areas 610 may be interspersed rather than segregated in the facility 602.

The facility 602 may include, or be coupled to, an inventory management system 622, which may perform some or all of the techniques described above with reference to FIGS. 1-5. For example, the inventory management system may maintain a virtual cart of each user within the facility. The inventory management system may also store a record associated with each user indicating the identity of the user, the location of the user, and whether the user is eligible to exit the facility with one or more items without performing a manual checkout of the items. The inventory management system may also generate and output notification data to the users, indicating whether or not they are so eligible.

As illustrated, the inventory management system 622 may reside at the facility 602 (e.g., as part of on-premises servers), on the servers 632 that are remote from the facility 602, a combination thereof. In each instance, the inventory management system 622 is configured to identify interactions and events with and between users 616, devices such as sensors 620, robots, material handling equipment, computing devices, and so forth, in one or more of the receiving area 606, the storage area 608, or the transition area 610. As described above, some interactions may further indicate the existence of one or more events 624—or predefined activities of interest. For example, events 624 may include the entry of the user 616 to the facility 602, stocking of items 604 at an inventory location 614, picking of an item 604 from an inventory location 614, returning of an item 604 to an inventory location 614, placement of an item 604 within a tote 618, movement of users 616 relative to one another, gestures by the users 616, and so forth. Other events 624 involving users 616 may include the user 616 providing authentication information in the facility 602, using a computing device at the facility 602 to authenticate identity to the inventory management system 622, and so forth. Some events 624 may involve one or more other objects within the facility 602. For example, the event 624 may comprise movement within the facility 602 of an inventory location 614, such as a counter mounted on wheels. Events 624 may involve one or more of the sensors 620. For example, a change in operation of a sensor 620, such as a sensor failure, change in alignment, and so forth, may be designated as an event 624. Continuing the example, movement of a camera 620(1) resulting in a change in the orientation of the field of view 628 (such as resulting from someone or something bumping the camera 620(1)) (e.g. camera 104) may be designated as an event 624.

By determining the occurrence of one or more of the events 624, the inventory management system 622 may generate output data 626. The output data 626 comprises information about the event 624. For example, where the event 624 comprises an item 604 being removed from an inventory location 614, the output data 626 may comprise an item identifier indicative of the particular item 604 that was removed from the inventory location 614 and a user identifier of a user that removed the item.

The inventory management system 622 may use one or more automated systems to generate the output data 626. For example, an artificial neural network, one or more classifiers, or other automated machine learning techniques may be used to process the sensor data from the one or more sensors 620 to generate output data 626. For example, the inventory management system may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 626 or the tentative results. The automated systems may generate confidence level data that provides information indicative of the accuracy or confidence that the output data 626 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 604, user 616, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 616 may pick an item 604(1) such as a perfume bottle that is generally cubical in shape from the inventory location 614. Other items 604 at nearby inventory locations 614 may be predominately spherical. Based on the difference in shape (cube vs. sphere) from the adjacent items, and the correspondence in shape with the previously stored image of the perfume bottle item 604(1) (cubical and cubical), the confidence level that the user 106 has picked up the perfume bottle item 604(1) is high.

In some situations, the automated techniques may be unable to generate output data 626 with a confidence level above a threshold result. For example, the automated techniques may be unable to distinguish which user 616 in a crowd of users 616 has picked up the item 604 from the inventory location 614. In other situations, it may be desirable to provide human confirmation of the event 624 or of the accuracy of the output data 626. For example, some items 604 may be deemed age restricted such that they are to be handled only by users 616 above a minimum age threshold.

In instances where human confirmation is desired, sensor data associated with an event 624 may be processed to generate inquiry data. The inquiry data may include a subset of the sensor data associated with the event 624. The inquiry data may also include one or more of one or more tentative results as determined by the automated techniques, or supplemental data. The subset of the sensor data may be determined using information about the one or more sensors 620. For example, camera data such as the location of the camera 620(1) within the facility 602, the orientation of the camera 620(1), and a field of view 628 of the camera 620(1) may be used to determine if a particular location within the facility 602 is within the field of view 628. The subset of the sensor data may include images that may show the inventory location 614 or that the item 604 was stowed. The subset of the sensor data may also omit images from other cameras 620(1) that did not have that inventory location 614 in the field of view 628. The field of view 628 may comprise a portion of the scene in the facility 602 that the sensor 620 is able to generate sensor data about.

Continuing the example, the subset of the sensor data may comprise a video clip acquired by one or more cameras 620(1) having a field of view 628 that includes the item 604. The tentative results may comprise the "best guess" as to which items 604 may have been involved in the event 624. For example, the tentative results may comprise results determined by the automated system that have a confidence level above a minimum threshold.

The facility 602 may be configured to receive different kinds of items 604 from various suppliers and to store them until a customer orders or retrieves one or more of the items 604. A general flow of items 604 through the facility 602 is indicated by the arrows of FIG. 2. Specifically, as illustrated in this example, items 604 may be received from one or more suppliers, such as manufacturers, distributors, wholesalers, and so forth, at the receiving area 606. In various implementations, the items 604 may include merchandise, commodities, perishables, or any suitable type of item 604, depending on the nature of the enterprise that operates the facility 602. The receiving of the items 604 may comprise one or more events 624 for which the inventory management system 622 may generate output data 626.

Upon being received from a supplier at receiving area 606, the items 604 may be prepared for storage. For example, items 604 may be unpacked or otherwise rearranged. The inventory management system 622 may include one or more software applications executing on a computer system to provide inventory management functions based on the events 624 associated with the unpacking or rearrangement. These inventory management functions may include maintaining information indicative of the type, quantity, condition, cost, location, weight, or any other suitable parameters with respect to the items 604. The items 604 may be stocked, managed, or dispensed in terms of countable, individual units or multiples, such as packages, cartons, crates, pallets, or other suitable aggregations. Alternatively, some items 604, such as bulk products, commodities, and so forth, may be stored in continuous or arbitrarily divisible amounts that may not be inherently organized into countable units. Such items 604 may be managed in terms of measurable quantity such as units of length, area, volume, weight, time, duration, or other dimensional properties characterized by units of measurement. Generally speaking, a quantity of an item 604 may refer to either a countable number of individual or aggregate units of an item 604 or a measurable amount of an item 604, as appropriate.

After arriving through the receiving area 606, items 604 may be stored within the storage area 608. In some implementations, like items 604 may be stored or displayed together in the inventory locations 614 such as in bins, on shelves, hanging from pegboards, and so forth. In this implementation, all items 604 of a given kind are stored in one inventory location 614. In other implementations, like items 604 may be stored in different inventory locations 614. For example, to optimize retrieval of certain items 604 having frequent turnover within a large physical facility 602, those items 604 may be stored in several different inventory locations 614 to reduce congestion that might occur at a single inventory location 614. Storage of the items 604 and their respective inventory locations 614 may comprise one or more events 624.

When a customer order specifying one or more items 604 is received, or as a user 616 progresses through the facility 602, the corresponding items 604 may be selected or "picked" from the inventory locations 614 containing those items 604. In various implementations, item picking may range from manual to completely automated picking. For example, in one implementation, a user 616 may have a list of items 604 they desire and may progress through the facility 602 picking items 604 from inventory locations 614 within the storage area 608, and placing those items 604 into a tote 618. In other implementations, employees of the facility 602 may pick items 604 using written or electronic pick lists derived from customer orders. These picked items 604 may be placed into the tote 618 as the employee progresses through the facility 602. Picking may comprise one or more events 624, such as the user 616 in moving to the inventory location 614, retrieval of the item 604 from the inventory location 614, and so forth.

After items 604 have been picked, they may be processed at a transition area 610. The transition area 610 may be any designated area within the facility 602 where items 604 are transitioned from one location to another or from one entity to another. For example, the transition area 610 may be a packing station within the facility 602. When the item 604 arrives at the transition area 610, the items 604 may be transitioned from the storage area 608 to the packing station. The transitioning may comprise one or more events 624. Information about the transition may be maintained by the inventory management system 622 using the output data 626 associated with those events 624.

In another example, if the items 604 are departing the facility 602 a list of the items 604 may be obtained and used by the inventory management system 622 to transition responsibility for, or custody of, the items 604 from the facility 602 to another entity. For example, a carrier may accept the items 604 for transport with that carrier accepting responsibility for the items 604 indicated in the list. In another example, a customer may purchase or rent the items 604 and remove the items 604 from the facility 602. The purchase or rental may comprise one or more events 624.

The inventory management system 622 may access or generate sensor data about the facility 602 and the contents therein including the items 604, the users 616, the totes 618, and so forth. The sensor data may be acquired by one or more of the sensors 620, data provided by other systems, and so forth. For example, the sensors 620 may include cameras 620(1) configured to acquire image data of scenes in the facility 602. The image data may comprise still images, video, or a combination thereof. The image data may be processed by the inventory management system 622 to determine a location of the user 616, the tote 618, the identity of the user 616, and so forth. As used herein, the identity of the user may represent a unique identifier of the user (e.g., name, number associated with user, username, etc.), an identifier that distinguishes the user amongst other users being located with the environment, or the like.

The inventory management system 622, or systems coupled thereto, may be configured to identify the user 616, as well as to determine other candidate users. In one implementation, this determination may comprise comparing sensor data with previously stored identity data. For example, the user 616 may be identified by showing their face to a facial recognition system, by presenting a token carrying authentication credentials, providing a fingerprint, scanning a barcode or other type of unique identifier upon entering the facility, and so forth. Identity of the user 616 may be determined before, during, or after entry to the facility 602. Determination of the user's 616 identity may comprise comparing sensor data associated with the user 616 in the facility 602 to previously stored user data.

In some instances, the inventory management system group users within the facility into respective sessions. That is, the inventory management system 622 may utilize the sensor data to determine groups of users that are effectively "together" (e.g., shopping together). In some instances, a particular session may include multiple users that entered the facility 602 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 618. Noting the child and the mother as belonging to the same session may increase the chances of successfully adding the box of cereal to the virtual shopping cart of the mother.

By determining the occurrence of one or more events 624 and the output data 626 associated therewith, the inventory management system 622 is able to provide one or more services to the users 616 of the facility 602. By utilizing one or more human associates to process inquiry data and generate response data that may then be used to produce output data 626, overall accuracy of the system may be enhanced. The enhanced accuracy may improve the user experience of the one or more users 616 of the facility 602. In some examples, the output data 626 may be transmitted over a network 630 to one or more servers 632.

FIG. 7 illustrates a block diagram of the one or more servers 632. The servers 632 may be physically present at the facility 602, may be accessible by the network 630, or a combination of both. The servers 632 do not require end-user knowledge of the physical location and configuration of the system that delivers the services. Common expressions associated with the servers 632 may include "on-demand computing," "software as a service (SaaS)," "cloud services," "data centers," and so forth. Services provided by the servers 632 may be distributed across one or more physical or virtual devices.

The servers 632 may include one or more hardware processors 702 (processors) configured to execute one or more stored instructions. The processors 702 may comprise one or more cores. The servers 632 may include one or more input/output (I/O) interface(s) 704 to allow the processor 702 or other portions of the servers 632 to communicate with other devices. The I/O interfaces 704 may comprise Inter-Integrated Circuit (I2C), Serial Peripheral Interface bus (SPI), Universal Serial Bus (USB) as promulgated by the USB Implementers Forum, and so forth.

The servers 632 may also include one or more communication interfaces 706. The communication interfaces 706 are configured to provide communications between the servers 632 and other devices, such as the sensors 620, the interface devices, routers, and so forth. The communication interfaces 706 may include devices configured to couple to personal area networks (PANs), wired and wireless local area networks (LANs), wired and wireless wide area networks (WANs), and so forth. For example, the communication interfaces 706 may include devices compatible with Ethernet, Wi-Fi™, and so forth. The servers 632 may also include one or more busses or other internal communications hardware or software that allow for the transfer of data between the various modules and components of the servers 632.

The servers 632 may also include a power supply 740. The power supply 740 is configured to provide electrical power suitable for operating the components in the servers 632.

The servers 632 may further include one or more memories 710. The memory 710 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 710 provides storage of computer-readable instructions, data structures, program modules, and other data for the operation of the servers 632. A few example functional modules are shown stored in the memory 710, although the same functionality may alternatively be implemented in hardware, firmware, or as a system on a chip (SOC).

The memory 710 may include at least one operating system (OS) component 712. The OS component 712 is configured to manage hardware resource devices such as the I/O interfaces 704, the communication interfaces 708, and provide various services to applications or components executing on the processors 702. The OS component 712 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 710. These components may be executed as foreground applications, background tasks, daemons, and so forth. A communication component 714 may be configured to establish communications with one or more of the sensors 620, one or more of the devices used by associates, other servers 632, or other devices. The communications may be authenticated, encrypted, and so forth.

The memory 710 may store an inventory management system 716. The inventory management system 716 is configured to provide the inventory functions as described herein with regard to the inventory management system 622. For example, the inventory management system 716 may track movement of items 604 in the facility 602, generate user interface data, and so forth.

The inventory management system 716 may access information stored in one or more data stores 718 in the memory 710. The data store 718 may use a flat file, database, linked list, tree, executable code, script, or other data structure to store the information. In some implementations, the data store 718 or a portion of the data store 718 may be distributed across one or more other devices including other servers 632, network attached storage devices, and so forth.

The data store 718 may include physical layout data 720. The physical layout data 720 provides a mapping of physical locations within the physical layout of devices and objects such as the sensors 620, inventory locations 614, and so forth. The physical layout data 720 may indicate the coordinates within the facility 602 of an inventory location 614, sensors 620 within view of that inventory location 614, and so forth. For example, the physical layout data 720 may include camera data comprising one or more of a location within the facility 602 of a camera 620(1), orientation of the camera 620(1), the operational status, and so forth. Continuing example, the physical layout data 720 may indicate the coordinates of the camera 620(1), pan and tilt information indicative of a direction that the field of view 628 is oriented along, whether the camera 620(1) is operating or malfunctioning, and so forth.

In some implementations, the inventory management system 716 may access the physical layout data 720 to determine if a location associated with the event 624 is within the field of view 628 of one or more sensors 620. Continuing the example above, given the location within the facility 602 of the event 624 and the camera data, the inventory management system 716 may determine the cameras 620(1) that may have generated images of the event 624.

The item data 722 comprises information associated with the items 604. The information may include information indicative of one or more inventory locations 614 at which one or more of the items 604 are stored. The item data 722 may also include order data, SKU or other product identifier, price, quantity on hand, weight, expiration date, images of the ITEM 604, detail description information, ratings, ranking, and so forth. The inventory management system 716 may store information associated with inventory management functions in the item data 722.

The data store 718 may also include sensor data 724. The sensor data 724 comprises information acquired from, or based on, the one or more sensors 620. For example, the sensor data 724 may comprise 3D information about an object in the facility 602. As described above, the sensors 620 may include a camera 620(1), which is configured to acquire one or more images. These images may be stored as the image data 726. The image data 726 may comprise information descriptive of a plurality of picture elements or pixels. Non-image data 728 may comprise information from other sensors 620, such as input from the microphones 920, weight sensors 620, and so forth.

User data 730 may also be stored in the data store 718. The user data 730 may include identity data, information indicative of a profile, purchase history, location data, images of the user 616, demographic data, and so forth. Individual users 616 or groups of users 616 may selectively provide user data 730 for use by the inventory management system 622. The individual users 616 or groups of users 616 may also authorize collection of the user data 730 during use of the facility 602 or access to user data 730 obtained from other systems. For example, the user 616 may opt-in to collection of the user data 730 to receive enhanced services while using the facility 602.

In some implementations, the user data 730 may include information designating a user 616 for special handling. For example, the user data 730 may indicate that a particular user 616 has been associated with an increased number of errors with respect to output data 626. The inventory management system 716 may be configured to use this information to apply additional scrutiny to the events 624 associated with this user 616. For example, events 624 that include an item 604 having a cost or result above the threshold amount may be provided to the associates for processing regardless of the determined level of confidence in the output data 626 as generated by the automated system.

The inventory management system 716 may include one or more of a location component 732, identification component 734, event-determination component 736, inquiry component 738, and checkout-eligibility component 705, potentially amongst other components 756.

The location component 732 functions to locate items or users within the environment of the facility to allow the inventory management system 716 to assign certain events to the correct users. That is, the location component 732 may assign unique identifiers to users as they enter the facility and, with the users' consent, may locate the users throughout the facility 602 over the time they remain in the facility 602. The location component 732 may perform this locating using sensor data 724, such as the image data 726. For example, the location component 732 may receive the image data 726 and may use facial-recognition techniques to identify users from the images. After identifying a particular user within the facility, the location component 732 may then locate the user within the images as the user moves throughout the facility 602. Further, should the location component 732 temporarily "lose" a particular user, the location component 732 may again attempt to identify the users within the facility based on facial recognition, and/or using other techniques such as voice recognition, or the like.

Therefore, upon receiving the indication of the time and location of the event in question, the location component 732 may query the data store 718 to determine which one or more users were at or within a threshold distance of the location of the event at the particular time of the event. Further, the location component 732 may assign different confidence levels to different users, with the confidence levels indicating how likely it is that each corresponding user is the user that is in fact associated with the event of interest.

The location component 732 may access the sensor data 724 in order to determine this location data of the user and/or items. The location data provides information indicative of a location of an object, such as the item 604, the user 616, the tote 618, and so forth. The location may be absolute with respect to the facility 602 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 602, 5.2 m from an inventory location 614 along a heading of 169°, and so forth. For example, the location data may indicate that the user 616(1) is 25.2 m along the aisle 612(1) and standing in front of the inventory location 614. In comparison, a relative location may indicate that the user 616(1) is 32 cm from the tote 618 at a heading of 73° with respect to the tote 118. The location data may include orientation information, such as which direction the user 616 is facing. The orientation may be determined by the relative direction the user's 916 body is facing. In some implementations, the orientation may be relative to the interface device. Continuing the example, the location data may indicate that the user 616(1) is oriented with a heading of 0°, or looking north. In another example, the location data may indicate that the user 616 is facing towards the interface device.

The identification component 734 is configured to identify an object. In one implementation, the identification component 734 may be configured to identify an item 604. In another implementation, the identification component 734 may be configured to identify the user 616. For example, the identification component 734 may use facial recognition techniques to process the image data 726 and determine the identity data of the user 616 depicted in the images by comparing the characteristics in the image data 726 with previously stored results. The identification component 734 may also access data from other sensors 620, such as from an RFID reader 920, an RF receiver 920, fingerprint sensors, and so forth.

The event-determination component 736 is configured to process the sensor data 724 and generate output data 726, and may include the components described above with reference to FIGS. 1 and 3. The event-determination component 736 may access information stored in the data store 718 including, but not limited to, event description data 742, confidence levels 744, or threshold values 746. In some instances, the event-determination component 736 may be configured to perform some or all of the techniques described above with regards to the event-determination component 106. For instance, the event-determination component 736 may be configured to create and utilize event classifiers for identifying events (e.g., predefined activity) within image data, potentially without use of other sensor data acquired by other sensors in the environment.

The event description data 742 comprises information indicative of one or more events 624. For example, the event description data 742 may comprise predefined profiles that designate movement of an item 604 from an inventory location 614 with the event 624 of "pick". The event description data 742 may be manually generated or automatically generated. The event description data 742 may include data indicative of triggers associated with events occurring in the facility 602. An event may be determined as occurring upon detection of the trigger. For example, sensor data 724 such as a change in weight from a weight sensor 620(6) at an inventory location 614 may trigger detection of an event of an item 604 being added or removed from the inventory location 614. In another example, the trigger may comprise an image of the user 616 reaching a hand toward the inventory location 614. In yet another example, the trigger may comprise two or more users 616 approaching to within a threshold distance of one another.

The event-determination component 736 may process the sensor data 724 using one or more techniques including, but not limited to, artificial neural networks, classifiers, decision trees, support vector machines, Bayesian networks, and so forth. For example, the event-determination component 736 may use a decision tree to determine occurrence of the "pick" event 624 based on sensor data 724. The event-determination component 736 may further use the sensor data 724 to determine one or more tentative results 748. The one or more tentative results 748 comprise data associated with the event 624. For example, where the event 624 comprises a disambiguation of users 616, the tentative results 748 may comprise a list of possible user 616 identities. In another example, where the event 624 comprises a disambiguation between items 104, the tentative results 748 may comprise a list of possible item identifiers. In some implementations, the tentative result 748 may indicate the possible action. For example, the action may comprise the user 616 picking, placing, moving an item 604, damaging an item 604, providing gestural input, and so forth.

In some implementations, the tentative results 748 may be generated by other components. For example, the tentative results 748 such as one or more possible identities or locations of the user 616 involved in the event 624 may be generated by the location component 732. In another example, the tentative results 748 such as possible items 604 that may have been involved in the event 624 may be generated by the identification component 734.

The event-determination component 736 may be configured to provide a confidence level 744 associated with the determination of the tentative results 748. The confidence level 744 provides indicia as to the expected level of accuracy of the tentative result 748. For example, a low confidence level 744 may indicate that the tentative result 748 has a low probability of corresponding to the actual circumstances of the event 624. In comparison, a high confidence level 744 may indicate that the tentative result 748 has a high probability of corresponding to the actual circumstances of the event 624.

In some implementations, the tentative results 748 having confidence levels 744 that exceed the threshold may be deemed to be sufficiently accurate and thus may be used as the output data 626. For example, the event-determination component 736 may provide tentative results 748 indicative of the three possible items 604(1), 904(2), and 904(3) corresponding to the "pick" event 624. The confidence levels 744 associated with the possible items 604(1), 904(2), and 904(3) may be 25%, 70%, 92%, respectively. Continuing the example, the threshold result 396 may be set such that confidence level 744 of 90% are deemed to be sufficiently accurate. As a result, the event-determination component 736 may designate the "pick" event 624 as involving item 604(3).

The inquiry component 738 may be configured to use at least a portion of the sensor data 724 associated with the event 624 to generate inquiry data 750. In some implementations, the inquiry data 750 may include one or more of the tentative results 748 or supplemental data 752. The inquiry component 738 may be configured to provide inquiry data 750 to one or more devices associated with one or more human associates.

An associate user interface is presented on the respective devices of associates. The associate may generate response data 754 by selecting a particular tentative result 748, entering new information, indicating that they are unable to answer the inquiry, and so forth.

The supplemental data 752 comprises information associated with the event 624 or that may be useful in interpreting the sensor data 724. For example, the supplemental data 752 may comprise previously stored images of the items 604. In another example, the supplemental data 752 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 626 during presentation to an associate.

The inquiry component 738 processes the response data 754 provided by the one or more associates. The processing may include calculating one or more statistical results associated with the response data 754. For example, statistical results may include a count of the number of times associates selected a particular tentative result 748, determination of a percentage of the associates that selected a particular tentative result 748, and so forth.

The inquiry component 738 is configured to generate the output data 626 based at least in part on the response data 754. For example, given that a majority of the associates returned response data 754 indicating that the item 604 associated with the "pick" event 624 is item 604(5), the output data 626 may indicate that the item 604(5) was picked.

The inquiry component 738 may be configured to selectively distribute inquiries to particular associates. For example, some associates may be better suited to answering particular types of inquiries. Performance data, such as statistical data about the performance of the associates, may be determined by the inquiry component 738 from the response data 754 provided by the associates. For example, information indicative of a percentage of different inquiries in which the particular associate selected response data 754 that disagreed with the majority of associates may be maintained. In some implementations, test or practice inquiry data 750 having a previously known correct answer may be provided to the associate for training or quality assurance purposes. The determination of the set of associates to use may be based at least in part on the performance data.

By using the inquiry component 738, the event-determination component 736 may be able to provide high reliability output data 626 that accurately represents the event 624. The output data 626 generated by the inquiry component 738 from the response data 754 may also be used to further train the automated systems used by the inventory management system 716. For example, the sensor data 724 and the output data 626, based on response data 754, may be provided to one or more of the components of the inventory management system 716 for training in process improvement. Continuing the example, this information may be provided to an artificial neural network, Bayesian network, and so forth, to further train these systems such that the confidence level 744 and the tentative results 748 produced in the future for the same or similar input is improved. Finally, as FIG. 7 illustrates, the servers 632 may store and/or utilize other data 758.

The checkout-eligibility component 750, meanwhile, may perform some or all of the operations described above with reference to processes 300, 400, and 500. For instance, the checkout-eligibility component 750 may store indications, for each of respective users within a facility, whether the respective user is currently eligible to exit through an AC exit location or otherwise eligible to exit a facility with one or more items without performing manual checkout of the items. The checkout-eligibility component 750 may change these respective indications based on predefined events that occur within the facility, as described above. For instance, a user that is identified upon entry to the facility may be initially eligible, but thereafter may be deemed ineligible upon performing an event at a non-AC-enabled inventory location. Conversely, a user that is not identified upon entry and, thus, initially ineligible may become eligible upon being identified by the identification component 734. The checkout-eligibility component 750 may also generate and output the notification data, discussed above.

Figure 8:
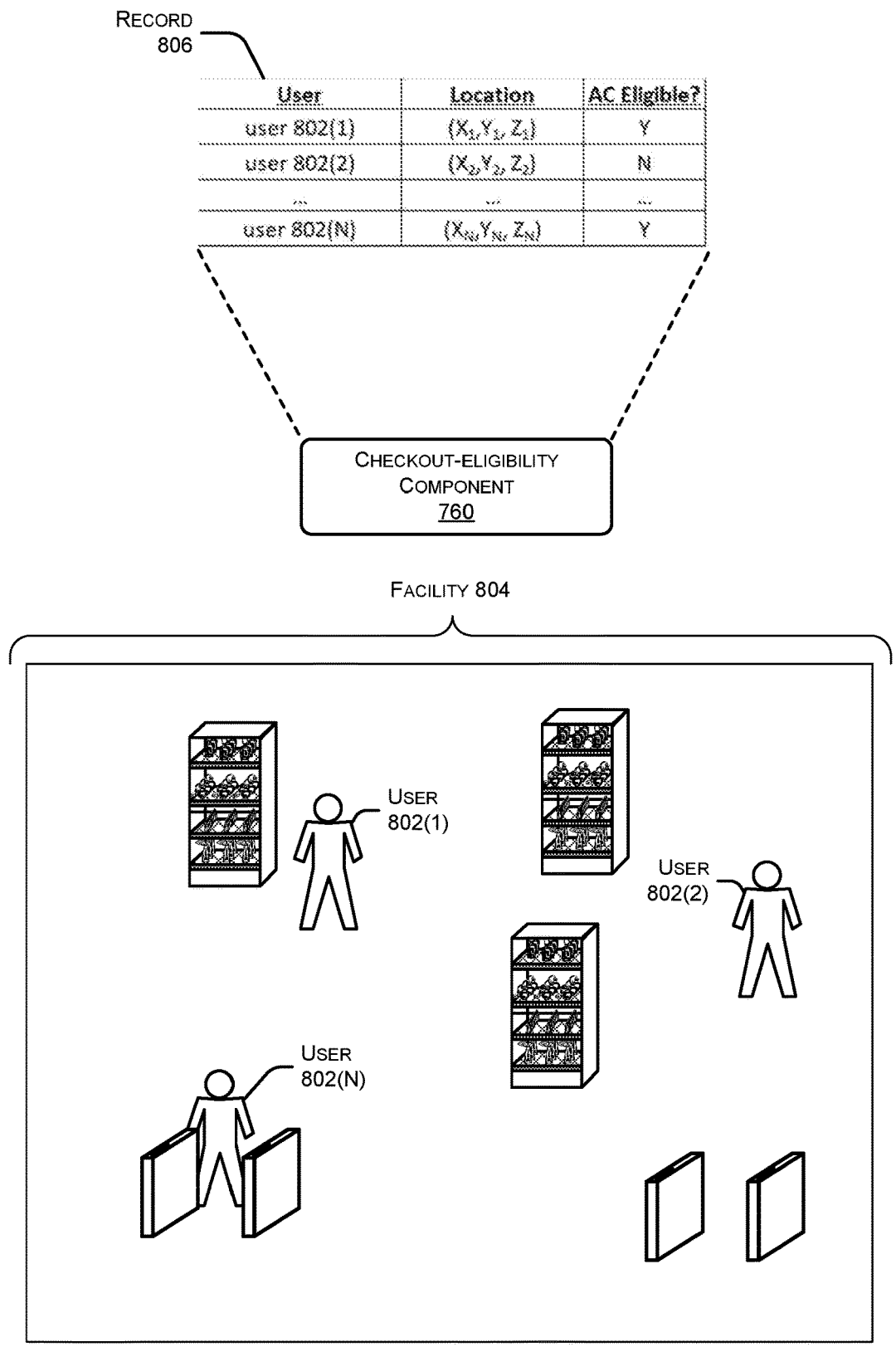
FIG. 8 illustrates an example record generated and updated by the checkout-eligibility component, the record indicating, in part, whether the user is eligible to exit the facility with one or more picked items without performing a manual checkout of the items.

FIG. 8 illustrates an example record 806 generated and/or updated by the checkout-eligibility component 750. In this example, the record 806 maintained by the checkout-eligibility component 750 corresponds to a time at a facility 804 that includes example users 802(1), 802(2), and 802(N). As illustrated, the example record 806 indicates that the identified user 802(1) is currently located at a particular location of $(X_1, Y_1, Z_1)$ within the facility and is currently eligible to exit the facility with one or more items and without performing a manual checkout of the items. The identified user 802(2), meanwhile, is located at a location of $(X_2, Y_2, Z_2)$ within the facility and is not currently eligible to exit the facility with one or more items and without performing a manual checkout of the items. Finally, the identified user 802(N) is currently located at a particular location of $(X_N, Y_N, Z_N)$ within the facility and is currently eligible to exit the facility with one or more items and without performing a manual checkout of the items. While not illustrated, in some instances a "user" in the record may deemed "unidentified" and, in these circumstances, may be deemed, at that time, ineligible to exit the facility with items without first performing a manual checkout of the items.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed, cause the one or more processors to perform acts comprising:
receiving an indication that a user is located within a facility;
storing, in a record associated with the user, an indication of whether the user is eligible to remove, from the facility, one or more items acquired by the user without performing a manual checkout of at least one of the one or more items;
causing a sensor to generate sensor data indicative of the user physically picking an item from an inventory location that is not enabled for automated checkout;
analyzing the sensor data to determine that the user physically picked the item from the inventory location that is not enabled for automated checkout; and at least partly in response to determining that the user physically picked the item from the inventory location that is not enabled for automated checkout, updating the record to indicate that the user is not eligible to remove, from the facility, the one or more items without performing the manual checkout of at least one of the one or more items.

2. The system as recited in claim 1, wherein the receiving the indication that the user is located within the facility comprises receiving an indication that account identification data associated with an account of the user has been provided at an entry gate of the facility.

3. The system as recited in claim 1, wherein the one or more computer-readable media further store computer-executable instructions that, when executed, cause the one or more processors to perform an act comprising determining that the user entered the facility through a first entrance that is associated with automated checkout.

4. The system as recited in claim 1, wherein the one or more computer-readable media further store computer-executable instructions that, when executed, cause the one or more processors to perform an act comprising determining that the user entered the facility without providing account identification data.

5. The system as recited in claim 1, wherein the one or more computer-readable media further store computer-executable instructions that, when executed, cause the one or more processors to perform an act comprising determining that an identity of the user is unknown.

6. The system as recited in claim 1, wherein the one or more computer-readable media further store computer-executable instructions that, when executed, cause the one or more processors to perform an act comprising storing, in the record, location data indicating a current location of the user in the facility.

7. The system as recited in claim 1, wherein the one or more computer-readable media further store computer-executable instructions that, when executed, cause the one or more processors to perform acts comprising:
  receiving additional sensor data generated in the facility;
  identifying, using the additional sensor data, an event indicative of the user at least one of picking an additional item from an inventory location in the facility or returning the additional item to the inventory location;
  determining a result associated with the event;
  determining a confidence level associated with the result; and
  determining that the confidence level is less than a threshold.

8. The system as recited in claim 1, wherein the one or more computer-readable media further store computer-executable instructions that, when executed, cause the one or more processors to perform acts comprising:
  generating notification data indicating that the user is not eligible to remove the one or more items without performing the manual checkout of at least one of the one or more items; and
  outputting the notification data.

9. The system as recited in claim 8, wherein the outputting the notification data comprises sending the notification data for output at an exit gate of the facility.

10. The system as recited in claim 8, wherein the outputting the notification data comprises sending the notification data to a mobile device of a user for output by the mobile device.

11. The system as recited in claim 1, wherein the one or more computer-readable media further store computer-executable instructions that, when executed, cause the one or more processors to perform acts comprising:
  detecting occurrence of a predefined event; and
  updating the record to indicate that the user is eligible to remove, from the facility, the one or more items without performing the manual checkout of the one or more items.

12. The system as recited in claim 11, wherein the one or more computer-readable media further store computer-executable instructions that, when executed, cause the one or more processors to perform an act comprising determining that a confidence level associated with the user picking an additional item from an inventory location in the facility has changed from a first value that is less than a threshold to a second value that is greater than the threshold, and wherein the detecting occurrence of the predefined event comprises detecting occurrence of the predefined event based at least in part on determining that the confidence value has changed from the first value to the second value.

13. The system as recited in claim 11, wherein the one or more computer-readable media further store computer-executable instructions that, when executed, cause the one or more processors to perform an act comprising determining an identity of the user, and wherein the detecting occurrence of the predefined event comprises detecting occurrence of the predefined event based at least in part on determining the identity of the user.

14. One or more non-transitory computer-readable media storing computer-executable instructions that, when executed, cause the one or more processors to perform acts comprising:
  receiving an indication that a user is located within a facility;
  storing, in a record associated with the user, an indication of whether the user is eligible to remove, from the facility, one or more items acquired by the user without performing a manual checkout of at least one of the one or more items;
  causing a sensor to generate sensor data indicative of the user physically picking an item from an inventory location that is not enabled for automated checkout;
  analyzing the sensor data to determine that the user physically picked the item from the inventory location that is not enabled for automated checkout; and
  at least partly in response to determining that the user physically picked the item from the inventory location that is not enabled for automated checkout, updating the record to indicate that the user is not eligible to remove, from the facility, the one or more items without performing the manual checkout of at least one of the one or more items.

15. The one or more non-transitory computer-readable media as recited in claim 14, wherein the one or more computer-readable media further store computer-executable instructions that, when executed, cause the one or more processors to perform acts comprising:
  generating notification data indicating that the user is not eligible to remove the one or more items without performing the manual checkout of at least one of the one or more items; and
  outputting the notification data.

16. The one or more non-transitory computer-readable media as recited in claim 15, wherein the outputting the notification data comprises at least one of sending the notification data for output at an exit gate of the facility or sending the notification data to a mobile device of a user for output by the mobile device.

\* \* \* \* \*